US012737425B2

(12) United States Patent
So et al.

(10) Patent No.: US 12,737,425 B2
(45) Date of Patent: Sep. 15, 2026

(54) TECHNIQUES FOR PROVIDING RELEVANT SEARCH RESULTS FOR SEARCH QUERIES

(71) Applicant: Apple, Inc., Cupertino, CA (US)

(72) Inventors: Kelvin So, San Jose, CA (US); Alok K. Agarwal, Palo Alto, CA (US); Xiangxin Zhu, Sunnyvale, CA (US); Yinfei Yang, Sunnyvale, CA (US); John M. Hornkvist, Los Gatos, CA (US); Hua Ouyang, Cupertino, CA (US); Srikanta N. Tirthapura, Saratoga, CA (US); Jiong Ming Pi, Foster City, CA (US); Wentao Wu, Millbrae, CA (US); Aditya K. Tayade, San Carlos, CA (US); Pulah J. Shah, Cupertino, CA (US); Ayush Pareek, Cupertino, CA (US); Bradley Puder, San Francisco, CA (US); Liqin Xu, Fremont, CA (US); Nader Namini Asl, Oakland, CA (US); Sai Pavan Kumar Unnam, San Leandro, CA (US); Shuona Wang, San Francisco, CA (US); Xiya Zhong, Beijing (CN); Xuan Wang, Shanghai (CN); Yinying Pan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/096,970

(22) Filed: Apr. 1, 2025

(65) Prior Publication Data

US 2025/0348550 A1 Nov. 13, 2025

Related U.S. Application Data

(60) Provisional application No. 63/676,832, filed on Jul. 29, 2024, provisional application No. 63/646,507, filed on May 13, 2024.

(51) Int. Cl.
*G06F 16/9535* (2019.01)
*G06F 16/334* (2025.01)

(52) U.S. Cl.
CPC ...... *G06F 16/9535* (2019.01); *G06F 16/3347* (2019.01)

(58) Field of Classification Search
CPC ............. G06F 16/9535; G06F 16/3347; G06F 16/9038; G06F 16/9035; G06F 16/90335; G06F 16/90332; G06F 18/22
See application file for complete search history.

(56) References Cited

U.S. PATENT DOCUMENTS

2018/0052908 A1* 2/2018 Liu ...................... G06F 16/316
2018/0096071 A1 4/2018 Green
(Continued)

OTHER PUBLICATIONS

International Patent Application No. PCT/US2025/028931; Int'l Search Report and the Written Opinion; dated Aug. 14, 2025; 11 pages.
(Continued)

*Primary Examiner* — Huawen A Peng
(74) *Attorney, Agent, or Firm* — BAKERHOSTETLER; Kyle B. Morse

(57) ABSTRACT

One embodiment sets forth a method for providing relevant search results for search queries. According to some embodiments, the method can be implemented by a client computing device, and includes the steps of (1) receiving a query, wherein the query is associated with a user account, and the user account is associated with a user account vector, (2) generating a query vector based at least in part on the query, (3) generating an output vector based at least in part on the query vector and the user account vector, (4) obtaining, based at least in part on the query, a plurality of digital asset vectors, wherein each digital asset vector of the plurality of digital asset vectors corresponds to a respective digital asset,
(Continued)

(5) comparing the output vector to the plurality of digital asset vectors to generate respective similarity scores for the plurality of digital asset vectors, (6) filtering the plurality of digital asset vectors in accordance with the similarity scores to establish a filtered plurality of digital asset vectors, and (7) displaying, in accordance with the filtered plurality of digital asset vectors, respective affordances for the respective digital assets that correspond to the filtered plurality of digital asset vectors.

35 Claims, 16 Drawing Sheets

(56) References Cited

U.S. PATENT DOCUMENTS

| | | | | |
|---|---|---|---|---|
| 2020/0089684 | A1 * | 3/2020 | Gotmanov | G06F 16/24578 |
| 2022/0188300 | A1 * | 6/2022 | Kim | G06F 16/248 |
| 2024/0220518 | A1 * | 7/2024 | Stowell | G06F 16/3347 |
| 2024/0281472 | A1 | 8/2024 | LaRhette et al. | |
| 2024/0289365 | A1 * | 8/2024 | Beauchamp | G06F 16/335 |
| 2025/0238470 | A1 * | 7/2025 | Penta | G06F 16/907 |

OTHER PUBLICATIONS

U.S. Appl. No. 19/016,017; Non-Final Office Action; dated Feb. 25, 2026; 27 pages.

* cited by examiner

DIGITAL ASSET 109

DIGITAL ASSET SOURCE 502
DIGITAL ASSET NAME 508
DIGITAL ASSET TYPE 514
DIGITAL ASSET SIZE 520
DIGITAL ASSET DATE 526
DIGITAL ASSET CONTENT 532

PROCESSING ENGINE 504
PROCESSING ENGINE 510
PROCESSING ENGINE 516
PROCESSING ENGINE 522
PROCESSING ENGINE 528
PROCESSING ENGINE 534

DIGITAL ASSET SOURCE VECTOR 506
DIGITAL ASSET NAME VECTOR 512
DIGITAL ASSET TYPE VECTOR 518
DIGITAL ASSET SIZE VECTOR 524
DIGITAL ASSET DATE VECTOR 530
DIGITAL ASSET CONTENT VECTOR 212

Digital Asset Manager 112

Digital Asset Metadata Vector 210

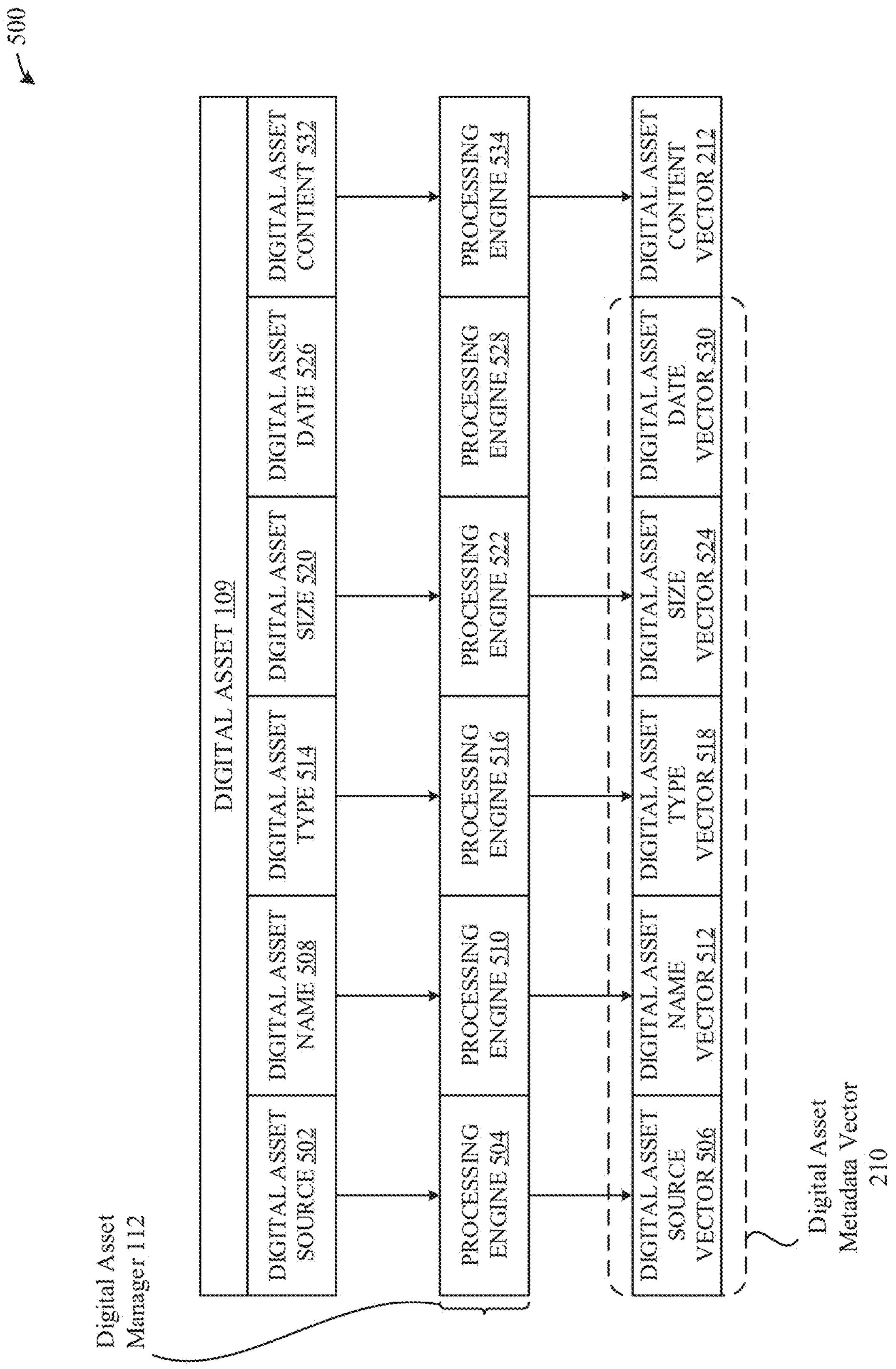

SEARCH QUERY 108

RETRIEVAL ENGINE 608

Retrieval Tree(s) 652

Query Embedding(s) 658

Indexes 126

KEYWORD INDEX 654

VECTOR INDEX 660

SPARSE PRIORITY QUEUE 656

CALIBRATION ENGINE 664

DENSE PRIORITY QUEUE 662

RANKING ENGINE 666

JOINT PRIORITY QUEUE 668

SIMILARITY ANALYZER 114

TECHNIQUES FOR PROVIDING RELEVANT SEARCH RESULTS FOR SEARCH QUERIES

CROSS-REFERENCE TO RELATED APPLICATIONS

The present patent application claims priority to U.S. Provisional Patent Application Ser. No. 63/676,832, entitled "TECHNIQUES FOR PROVIDING RELEVANT SEARCH RESULTS FOR SEARCH QUERIES" filed Jul. 29, 2024, and to U.S. Provisional Patent Application Ser. No. 63/646,507, entitled "TECHNIQUES FOR PROVIDING RELEVANT SEARCH RESULTS FOR SEARCH QUERIES" filed May 13, 2024, which are hereby incorporated by reference in their entireties for all purposes.

FIELD

The described embodiments relate generally to implementing search algorithms. More particularly, the described embodiments set forth techniques for providing relevant search results for search queries.

BACKGROUND

Returning relevant search results to users based on their search queries can be a complex endeavor. In particular, returning relevant search results requires a sophisticated understanding of users' intent as well as efficiently accessing and utilizing the vast amount of information that is available (e.g., through local databases, knowledge graphs, the Internet, etc.). This can be difficult, however, for at least the following reasons.

First, the inherent ambiguity in search queries presents a significant challenge. In particular, users often express their informational needs in imprecise or vague terms, which can make it difficult for search algorithms to accurately interpret the users' intent. For example, a user searching for "java" could be looking for information about the island of Java in Indonesia, Java coffee, or the programming language Java®. Despite these challenges, deciphering users' intent remains an important aspect in providing relevant search results to them.

Second, the sheer volume of data that is accessible to search algorithms-such as through the Internet, through locally-accessible data sets, etc.-can be overwhelming. For example, search algorithms must crawl and index an immense number of web pages, and this vastness of information makes it challenging to ensure that all relevant data is considered when providing search results. Additionally, it is resource-intensive to keep these indexes up to date relative to the constantly-changing landscape of the Internet.

Third, language and cultural nuances often can add another layer of complexity. In particular, search algorithms must consider regional language variations, idiomatic expressions, and cultural differences to provide search results to users that are relevant and contextual to their locales. This can be problematic, however, as the meaning of a commonly used search term in one region could be entirely different in another, thereby leading to potential misinterpretations and inaccurate/irrelevant search results.

Additionally, personalization plays a crucial role in providing search results, but it also introduces challenges. In particular, a given search algorithm may aim to provide results that are tailored to a given user's individual preferences, search history, and so on. However, striking the right balance between personalization, diversity, and privacy considerations can be difficult. For example, a search algorithm that overemphasizes the user's search history may generate results that are highly specific to the user even when the user is only seeking a generic response to their inquiry. Conversely, a search algorithm that disregards the user's search history may generate search results that are highly generic to the user despite the user's desire to obtain more personalized search results.

In sum, the difficulty of returning relevant search results to users based on their search inputs arises from the ambiguity of search queries, the vastness of available information, language and cultural nuances, the complexities of personalization (while respecting privacy), and the ever-evolving nature of search algorithm algorithms. Addressing these challenges requires a combination of advanced technology, ongoing research, and a deep understanding of user behavior and intent in order to continually improve search experiences for users.

Accordingly, what is needed are improved techniques for providing relevant search results to users in response to their search queries.

SUMMARY

The described embodiments relate generally to implementing search algorithms. More particularly, the described embodiments set forth techniques for providing relevant search results for search queries.

One embodiment sets forth a method for providing relevant search results for search queries. According to some embodiments, the method can be implemented by a client computing device, and includes the steps of (1) receiving a query, wherein the query is associated with a user account, and the user account is associated with a user account vector, (2) generating a query vector based at least in part on the query, (3) generating an output vector based at least in part on the query vector and the user account vector, (4) obtaining, based at least in part on the query, a plurality of digital asset vectors, wherein each digital asset vector of the plurality of digital asset vectors corresponds to a respective digital asset, (5) comparing the output vector to the plurality of digital asset vectors to generate respective similarity scores for the plurality of digital asset vectors, (6) filtering the plurality of digital asset vectors in accordance with the similarity scores to establish a filtered plurality of digital asset vectors, and (7) displaying, in accordance with the filtered plurality of digital asset vectors, respective affordances for the respective digital assets that correspond to the filtered plurality of digital asset vectors.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 5 illustrates a block diagram that provides examples of different aspects, characteristics, etc., of a digital asset that can be considered when generating a corresponding digital asset metadata vector and a corresponding digital asset audio vector, according to some embodiments.

DETAILED DESCRIPTION

Figure 1:
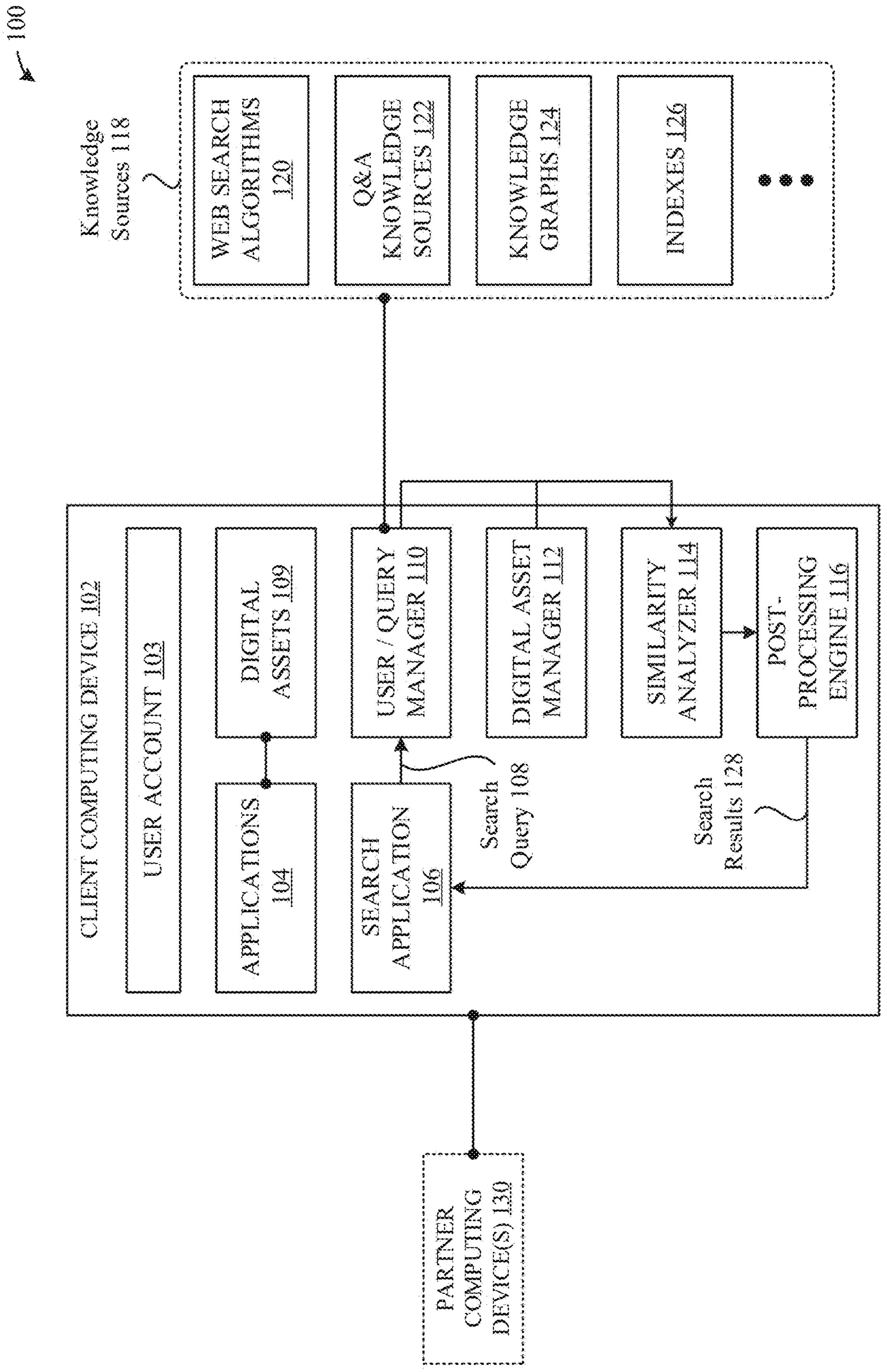
FIG. 1 illustrates a block diagram of different components of a system that can be configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments relate generally to implementing search algorithms. More particularly, the described embodiments set forth techniques for providing relevant search results for search queries.

Personal computing devices intake a substantial number of digital assets to manage on a daily basis, including emails, documents, photos, videos, songs, and so on. This presents challenges with respect to providing relevant search results (i.e., digital assets) for search queries provided by users when searching for the aforementioned digital assets, specific information included within the digital assets, and so on. For example, the challenges include identifying digital assets that exhibit semantic relevance, but that are not necessarily an exact match to search queries. The challenges also include providing personalized (i.e., user-relevant) search results for different users who submit the same search query. The challenges further include deriving information from different types of digital assets that, when combined/analyzed together, can yield enhanced search results.

Accordingly, the embodiments set forth techniques for generating foundational digital asset embeddings (also referred to herein as "vectors") for digital assets that are accessible to personal computing devices. According to some embodiments, the techniques utilize features of a given digital asset that are available at the time of intake (e.g., receipt, acquisition, etc.) to train models and to subsequently have a corresponding digital asset embedding that is readily usable to provide useful features. According to some embodiments, stable input embeddings can be utilized so that the digital asset embeddings can be generated and utilized without having to retrain the models at frequent intervals. According to some embodiments, a given digital asset embedding can stem from multiple modalities of its corresponding digital asset. For example, for a given email, the modalities can include metadata associated with the email (e.g., sender/receiver information, date information, subject line information etc.), text associated with the email (e.g., text included in the main body of the email), attachments included with the email (e.g., documents, photos, videos, songs, hyperlinks, etc.), and so on. In another example, for a given document, the modalities can include metadata associated with the document (e.g., creation date/time information, author information, etc.), text/media included in the document, and so on.

As described in greater detail herein, the aforementioned modalities can be utilized to enrich contextual comprehension and to adeptly manage instances of ambiguity (e.g., where the digital asset's metadata falls short in enabling disambiguation). Moreover, because the embodiments described herein leverage content-based features that are available at the time of the creation, acquisition, etc., of a given digital asset, relevant digital assets can be identified somewhat immediately (in contrast to, for example, leveraging behavioral-focused features). As a result, various benefits can be achieved, which are discussed in greater detail herein.

FIG. 1 illustrates a block diagram of different components of a system 100 that can be configured to implement the various techniques described herein, according to some embodiments. As shown in FIG. 1, the system 100 can include a client computing device 102 and, optionally, one or more partner computing devices 130. It is noted that, in the interest of simplifying this disclosure, the client computing device 102 and the partner computing device 130 are typically discussed in singular capacities. In that regard, it should be appreciated that the system 100 can include any number of client computing devices 102 and partner computing devices 130, without departing from the scope of this disclosure.

According to some embodiments, the client computing device 102 and the partner computing device 130 can represent any form of computing device operated by an individual, an entity, etc., such as a wearable computing device, a smartphone computing device, a tablet computing device, a laptop computing device, a desktop computing device, a gaming computing device, a smart home computing device, an Internet of Things (IoT) computing device, a rack mount computing device, and so on. It is noted that the foregoing examples are not meant to be limiting, and that each of the client computing device 102/partner computing device 130 can represent any type, form, etc., of computing device, without departing from the scope of this disclosure.

According to some embodiments, the client computing device 102 can be associated with (i.e., logged into) a user account 103 that is known to the client computing device 102 and the partner computing device 130. For example, the user account 103 can be associated with username/password information, demographic-related information, device-related information (e.g., identifiers of client computing devices 102 associated with the user account 103), and the like. According to some embodiments, the user account 103 can also be associated with conversation history information, which can include information associated with search queries 108 (performed on the client computing device 102), search results 128 (returned at the client computing device 102), as well as any other type, form, etc., of information, at any level of granularity, pertaining to activity performed at the client computing device 102, activity performed at the partner computing device 130, the interactions between the client computing device 102 and the partner computing device 130, and so on. As described in greater detail herein, the user account 103 can also be associated with a user account vector (that is based at least in part on the user account 103), query vectors (that are based at least in part on search queries 108 provided by client computing devices 102 associated with the user account 103), and the like. A more detailed explanation of the user account 103, search queries 108, etc., is provided below in conjunction with FIGS. 2-4.

As shown in FIG. 1, the client computing device 102 can manage digital assets 109 (e.g., stored on one or more local storage devices, one or more network storage devices, one or more cloud-based storages, etc.). According to some embodiments, each digital asset 109 can be associated with one or more software applications 104 on the client computing device 102. For example, a photo software application 104 can be associated with digital photos, images, etc., in the form of digital assets 109. In another example, an email software application 104 can be associated with emails, contacts, calendar entries, task items, etc., in the form of digital assets 109. In yet another example, a document software application 104 can be associated with word processing documents, spreadsheet documents, presentation documents, etc., in the form of digital assets 109. In yet another example, a web browser software application 104 can be associated with browsing history information, bookmark information, reading list information, etc., in the form of digital assets 109. In yet another example, a maps software application 104 can be associated with favorite address information, travel history information, etc., in the form of digital assets 109. In a further example, a media playback software application 104 can be associated with favorite song information, playlist information, playback history information, etc., in the form of digital assets 109. It is noted that the foregoing software application 104 examples are not meant to be limiting, and that a given software application 104 can represent any type, form, etc., of software application 104, consistent with the scope of this disclosure. It is additionally noted that the foregoing digital asset 109 examples are not meant to be limiting, and that a given digital asset 109 can represent any amount, type, form, etc., of digital asset(s) 109, at any granularity, consistent with the scope of this disclosure.

In any case—and, as described in greater detail herein—each digital asset 109 can be associated with additional information, such as a digital asset metadata vector (that is based at least in part on metadata of the digital asset 109), a digital asset content vector (that is based at least in part on the actual content of the digital asset 109), and the like. A more detailed explanation of the digital assets 109 and their associated information is provided below in conjunction with FIGS. 2 and 5.

As shown in FIG. 1, and as described in greater detail herein, the client computing device 102 can implement a search application 106 that can be configured to receive input, translate the input into a search query 108, and provide the search query 108 to other entities to provoke the other entities to provide search results 128. It should be appreciated that this configuration provides enhanced privacy features in that the search queries 108, digital assets 109, and search results 128 are locally-processed on the client computing device 102. This approach can reduce some of the privacy risks that may be inherent when transferring the foregoing information elsewhere for processing (e.g., a partner computing device 130), although overall processing latencies and battery life preservation can present challenges due the inherently limited hardware characteristics of the client computing device 102 relative to the partner computing device 130. In this regard, it should also be appreciated that the client computing device 102 can interface with other entities—such as one or more partner computing devices 130—to implement all or a portion of the features described herein. However, this approach can increase some of the privacy risks that may be inherent when transferring the foregoing information elsewhere for processing, although the aforementioned processing latencies and battery life preservation concerns can be mitigated due to the enhanced hardware characteristics of the partner computing devices 130 relative to the client computing device 102. In the interest of simplifying this disclosure, the primarily-discussed embodiments utilize an on-device approach, i.e., where the client computing device 102 implements the techniques with no (or very little involvement) from external entities such as partner computing devices 130.

According to some embodiments, the search results 128 can be organized, formatted, etc., in a manner that is understood by the search application 106. In turn, the search application 106 can display the search results 128 through its own user interfaces, the user interfaces of software applications 104, etc., to enable a user of the client computing device 102 to interact with the search results 128. For example, the search application 106 can be configured to, in conjunction with receiving search results 128 for a given search query 108, generate and output a user interface for display on a display device (e.g., one that is communicatively coupled to the client computing device 102), where the user interface includes a separate entry for at least a subset of the digital assets 109 referenced in the search results 128. In one example, an entry for a given digital asset 109 can include a relevant thumbnail image (e.g., an icon for a file type of the digital asset 109, a thumbnail image/video/etc. that is relevant to portion of the digital asset 109 that corresponds to the search query 108, etc.), an explanation of how/why/etc. the digital asset 109 was selected to be included in the search results, an indication of a software application 104 that manages the digital asset 109, and so on. The entry can also be configured to enable a user to interact with the information included in the entry, such as expanding the information included in the entry, opening the digital asset 109/software application 104, providing feedback (e.g., indicating that the digital asset 109 is/is not relevant to the search query 108, which can be used to enhance/fine-tune/personalize the techniques described herein), and so on. It is noted that the foregoing examples are not meant to be limiting, and that the user interface, entries, etc., can include any amount, type, form, etc., of information, at any level of granularity, consistent with the scope of this disclosure.

As described in greater detail herein, the user account 103 can be utilized to improve the overall accuracy of the search results 128 that are generated and provided by the client computing device 102 for search queries 108. According to some embodiments, the client computing device 102 can implement a user/query manager 110. As described below in conjunction with FIGS. 2-3, the user/query manager 110 can be configured to generate/maintain the aforementioned user account vectors for the user account 103, to generate query vectors for search queries 108 received from client computing devices 102 associated with the user account 103, and to perform other functionalities that are described herein. In turn, the user/query manager 110 can generate user/query output vectors that can be utilized, at least in part along with digital asset output vectors (the details of which are described below), to provide search results 128 that are relevant to the search queries 108, personalized to the user account 103, and so on.

According to some embodiments, the client computing device 102 can implement a digital asset manager 112. As described below in conjunction with FIGS. 2 and 5, the digital asset manager 112 can be configured to generate/maintain the aforementioned digital asset metadata vectors, digital asset audio vectors, etc., for the digital assets 109. In doing so, the digital asset manager 112 can generate digital asset output vectors that can be utilized, at least in part along with the user/query output vectors, to provide search results 128 that are relevant to the search queries 108, personalized to the user account 103, and so on.

Additionally, and as shown in FIG. 1, the client computing device 102 can implement a similarity analyzer 114, which can be configured to compare the outputs from the user/query manager 110 and the digital asset manager 112 (i.e., the user/query output vectors and the digital asset output vectors, respectively). In particular, the similarity analyzer 114 can implement algorithms that compare the similarities between the aforementioned output vectors, generate similarity scores that represent/coincide with the similarities, and so on. The algorithms can include, for example, Cosine Similarity, Euclidean Distance, Manhattan Distance (L1 norm), Jaccard Similarity, Hamming Distance, Pearson Correlation Coefficient, Spearman Rank Correlation, Minkowski Distance, Kullback-Leibler Divergence (KL Divergence), etc., algorithms. It is noted that the foregoing examples are not meant to be limiting, and that the similarity analyzer 114 can implement any number, type, form, etc., of similarity analysis algorithms, at any level of granularity, consistent with the scope of this disclosure.

According to some embodiments, the user/query manager 110, the digital asset manager 112, and the similarity analyzer 114 can represent one or more artificial intelligence (AI) models-such as small language models (SLMs), large language models (LLMs), rule-based models, traditional machine learning models, custom models, ensemble models, knowledge graph models, hybrid models, domain-specific models, sparse models, transfer learning models, symbolic artificial intelligence (AI) models, generative adversarial network models, reinforcement learning models, biological models, and the like. It is noted that the foregoing examples are not meant to be limiting, and that any number, type, form, etc., of AI models can be implemented by any of the entities illustrated in FIG. 1, without departing from the scope of this disclosure. Additionally, it should be appreciated that one or more of the entities illustrated in FIG. 1 can represent non-AI-based entities, such as rules-based systems, knowledge-based systems, and so on.

As a brief aside, it is noted that the client computing device 102 can be configured to identify and eliminate "AI hallucinations," which refer to the generation of false or distorted perceptions, ideas, or sensations by AI systems. This phenomenon can occur when AI models, such as LLMs, generate outputs that are not based on real data but instead originate from patterns or noise present in their training data or model architecture. Such hallucinations can manifest as incorrect information, fantastical scenarios, nonsensical sentences, or a blend of real and fabricated content.

As additionally shown in FIG. 1, the client computing device 102 can implement a post-processing engine 116, which can be configured to provide search results 128 that are personalized for the user account 103 (based at least in part on, for example, the similarity analyses performed by the similarity analyzer 114). Personalizing search results 128 for a given search query 108 (e.g., provided by a user of the client computing device 102 associated with a user account 103), can include, for example, culling digital assets 109 having similarity scores that do not satisfy a particular threshold (that coincides with the similarity score scheme), reordering the remaining digital assets 109 based on their similarity scores, emphasizing digital assets 109 having similarity scores that satisfy a particular threshold, and so on. Additionally, providing search results 128 for a given search query 108 can include generating a descriptive answer to the search query 108 based on (1) the search query 108, and (2) the digital assets 109 that are identified. It is noted that the foregoing examples are not meant to be limiting, and that the post-processing engine 116 can implement any number, type, form, etc., of operations when providing search results 128, at any level of granularity, consistent with the scope of this disclosure.

Additionally, and according to some embodiments, the post-processing engine 116 can be configured to implement an explanation agent (not illustrated in FIG. 1). According to some embodiments, the explanation agent can be configured to implement any number, type, form, etc., of AI models to provide explanations for one or more of the search results 128. To implement this functionality, the explanation agent can analyze any amount of information, at any level of granularity. In one example, the explanation for a given search result 128 (e.g., a digital asset 109) can include a breakdown of why the digital asset 109 is relevant, a breakdown of how the digital asset 109 was identified, a breakdown of where the digital asset 109 was located, and so on. It is noted that the foregoing examples are not meant to be limiting, and that the explanations can include any amount, type, form, etc., of information, at any level of granularity, without departing from the scope of this disclosure.

Additionally, it is noted that, under some configurations, the explanation agent can also be configured to provide explanations for search results 128 that were filtered out by the post-processing engine 116. In turn, such explanations can be utilized in any manner to improve the manner in which the system 100 generates search results 128. For example, the explanations can be used to improve the intelligence of the various AI models discussed herein, to demonstrate to end-users that time is being saved by intelligently eliminating certain results for good/explainable reasons, and so on.

Additionally, and according to some embodiments, the client computing device 102 can be configured to implement a content agent (not illustrated in FIG. 1). According to some embodiments, the content agent can be configured to implement any number, type, form, etc., of AI models to generate content that is relevant to the search results 128. For example, the content agent can implement generative adversarial networks (GANs), variational autoencoders (VAEs), recurrent neural networks (RNNs), convolutional neural networks (CNNs), neuroevolution systems, deep dream systems, style transfer systems, rule-based systems, interactive evolutionary algorithms, and so on. Such content can include, for example, digital content that corresponds to the search results 128 (e.g., text content, image content, audio content, video content, etc.), digital content that corresponds to the digital assets 109 referenced in the search results, digital content that corresponds to the search query 108, and the like. It is noted that the foregoing examples are not meant to be limiting, and that the content agent can generate any amount, type, form, etc., of digital content, at any level of granularity, without departing from the scope of this disclosure. For example, the content can include audio content, video content, document content, web content (e.g., hypertext markup language (HTML) content), programming language content, and so on.

As further shown in FIG. 1, the client computing device 102—particularly, the various entities implemented thereon—can optionally be configured to implement, interface with, etc., knowledge sources 118 (e.g., to expand on a relatively generic search query 108 in order to effectively gather more accurate search results 128). According to some embodiments, the knowledge sources 118 can include, for example, web search algorithms 120, question and answer (Q&A) knowledge sources 122, knowledge graphs 124, indexes 126 (e.g., databases, approximate nearest-neighbor (ANN) indexes, inverted indexes, etc.), and so on.

According to some embodiments, the web search algorithms 120 can represent web search entities that are capable of receiving queries and providing answers based on what is accessible via the Internet. To implement this functionality, the web search algorithms 120 can "crawl" the Internet, which involves identifying, parsing, and indexing the content of web pages, such that relevant content can be efficiently identified for search queries that are received.

According to some embodiments, the Q&A knowledge sources 122 can represent systems, databases, etc., that can formulate answers to questions that are commonly received. To implement this functionality, the Q&A knowledge sources 122 typically rely on structured or semi-structured knowledge bases that contain a wide range of information, facts, data, or textual content that is manually curated, generated from text corpora, or collected from various sources, such as books, articles, databases, or the Internet.

According to some embodiments, the knowledge graphs 124 can represent systems, databases, etc., that can be accessed to formulate answers to queries that are received. A given knowledge graph 124 typically constitutes a structured representation of knowledge that captures relationships and connections between entities, concepts, data points, etc. in a way that computing devices are capable of understanding.

According to some embodiments, the indexes 126 can represent systems, databases, etc., that can be accessed to formulate answers to queries that are received. For example, the indexes 126 can include one or more keyword indexes that constitute data structures that are arranged in a manner that enable keyword searches to be efficiently performed. The indexes 126 can include one or more ANN indexes that constitute data structures that are arranged in a manner that enable similarity searches and retrievals in high-dimensional spaces to be efficiently performed. This makes the ANN indexes particularly useful when performing tasks that involve semantic information retrieval, recommendations, and finding similar data points, objects, and so on.

It is noted that the knowledge sources 118 illustrated in FIG. 1 and described herein are not meant to be limiting, and that the entities implemented on the client computing device 102 can be configured to access any type, kind, form, etc., of knowledge source 118 that is capable of receiving queries and providing responses, without departing from the scope of this disclosure. It should also be appreciated that the knowledge sources 118 can employ any number, type, form, etc., of AI models (or non-AI based approaches) to provide the various functionalities described herein, without departing from the scope of this disclosure. It should also be understood that the knowledge sources 118 can be implemented by any computing entity (e.g., the client computing device 102, the partner computing device 130, etc.), service (e.g., cloud service providers), etc., without departing from the scope of this disclosure (depending on, e.g., privacy settings that are enforced by the client computing device 102). It should be appreciated that when knowledge sources 118 are external to and utilized by the client computing device 102, the search query 108 can be filtered, anonymized, etc., in order to reduce/eliminate sensitive information that could otherwise be gleaned from the search query 108.

It is noted that the logical breakdown of the entities illustrated in FIG. 1—as well as the logical flow of the manner in which such entities communicate—should not be construed as limiting. On the contrary, any of the entities illustrated in FIG. 1 can be separated into additional entities within the system 100, combined together within the system 100, or removed from the system 100, without departing from the scope of this disclosure. It is additionally noted that, in the interest of unifying and simplifying this disclosure, the described embodiments primarily discuss common/popular types of digital assets 109, such as emails, documents, photos, videos, songs, and so on. However, it should be appreciated that the embodiments disclosed herein can be implemented to receive search queries 108—and to provide search results 128—for any type of digital asset 109, such as databases, archives, executables, scripts, web files, configuration files, logs, programming source code, system files, backups, disk images, CAD files, and so on. It is noted that the foregoing examples are not meant to be limiting, and that the embodiments can be implemented to identify any amount, type, form, etc., of digital asset 109, at any level of granularity, consistent with the scope of this disclosure.

Additionally, it should be understood that the various components of the computing devices illustrated in FIG. 1 are presented at a high level in the interest of simplification. For example, although not illustrated in FIG. 1, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 9. It should additionally be understood that the computing devices can include other entities that enable the implementation of the various techniques described herein, without departing from the scope of this disclosure. It should additionally be understood that the entities described herein can be combined or split into additional entities, without departing from the scope of this disclosure. It should further be understood that the various entities described herein can be implemented using software-based or hardware-based approaches, without departing from the scope of this disclosure.

Accordingly, FIG. 1 provides an overview of the manner in which the system 100 can implement the various techniques described herein, according to some embodiments. A more detailed breakdown of the manner in which these techniques can be implemented will now be provided below in conjunction with FIGS. 2-9.

Figure 2:
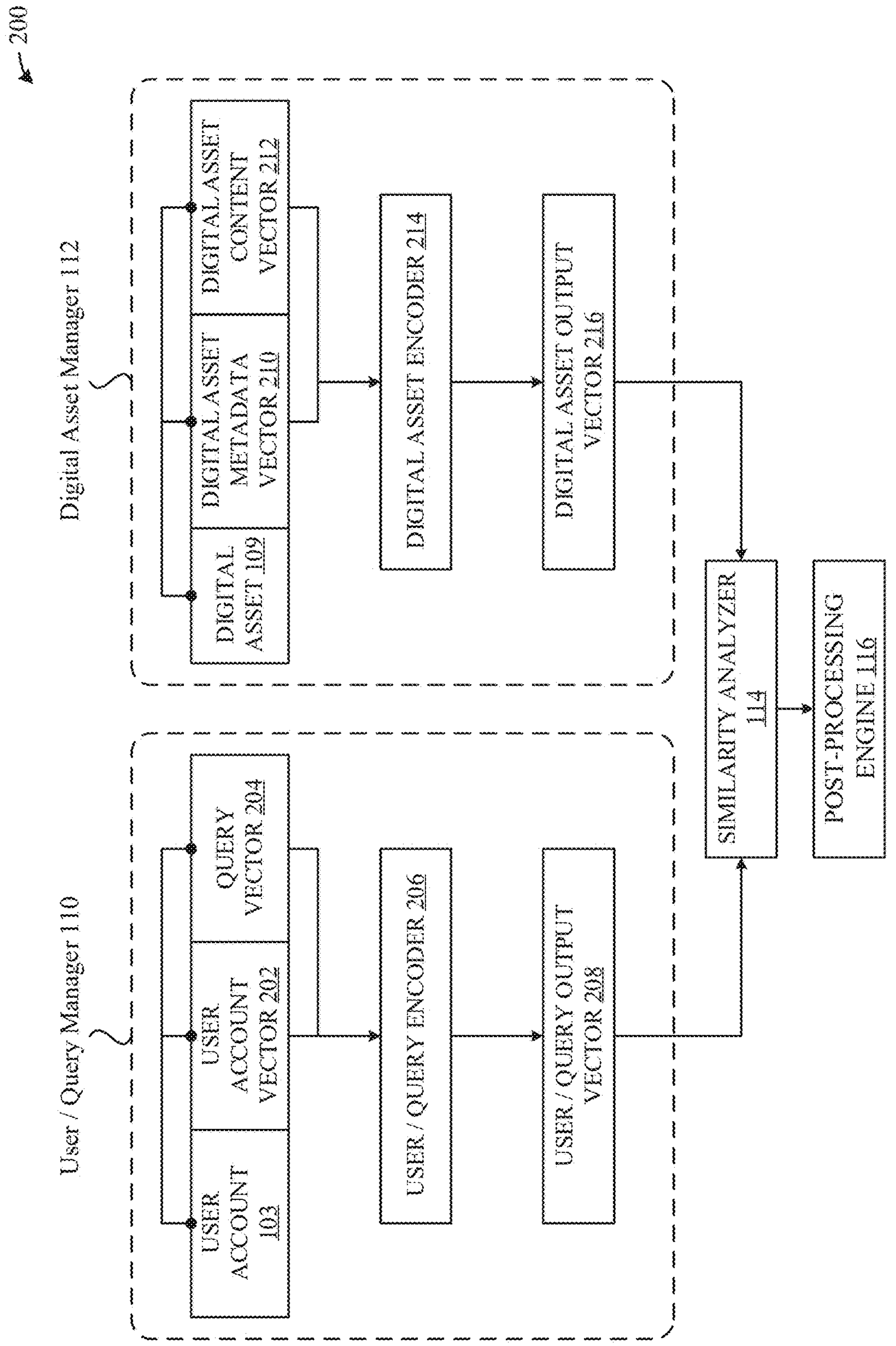
FIG. 2 illustrates a block diagram that provides an understanding of how a user/query manager, a digital asset manager, a similarity analyzer, and a post-processing engine can function, interact with one another, etc., to generate query results for search queries, according to some embodiments.

FIG. 2 illustrates a block diagram 200 that provides an understanding of how the user/query manager 110, the digital asset manager 112, the similarity analyzer 114, and the post-processing engine 116 can function, interact with one another, etc., to generate search results 128 for search queries 108, according to some embodiments. As shown in FIG. 2, the user/query manager 110 can manage, the user account 103 associated with the client computing device 102, a respective user account vector 202. According to some embodiments, the user/query manager 110 can generate the user account vector 202 at an appropriate time, e.g., when the user account 103 is created, when the user account 103 is registered to access the search-related features (described herein) provided by the client computing device 102, and so on. According to some embodiments, the user/query manager 110 can manage, update, etc., the user account vector 202 over time to account for new information that is provided in association with the user account 103, learned about the user account 103, and so on.

According to some embodiments, the vectors described herein can represent foundational embeddings (i.e., vectors) that are stable in nature. As a brief aside, in the realm of artificial intelligence (AI) and machine learning, the generation of stable vectors for data can utilized to implement effective model training and inference. Generating stable vectors involves a systematic approach that can begin with data pre-processing, where raw data undergoes cleaning procedures to address missing values, outliers, and inconsistencies. Numerical features can be standardized or normalized to establish a uniform scale, while categorical variables can be encoded into numerical representations through techniques such as one-hot encoding or label encoding. Feature engineering can be employed to identify and create relevant features that enhance the model's capacity to discern patterns within the data. Additionally, for text data, tokenization can be employed to break down the text into constituent words or sub-word units, which can then be converted into numerical vectors using methodologies like word embeddings.

The aforementioned vectorization processes can be used to amalgamate all features into a unified vector representation. Careful consideration can be given to normalization to ensure stability across different feature scales. Additional considerations can involve the handling of sequential data through techniques such as recurrent neural networks (RNNs) and transformers, as well as dimensionality reduction methods such as Principal Component Analysis (PCA) or t-distributed Stochastic Neighbor Embedding (t-SNE). Embedding layers may also be applied for certain data types, and consistency throughout the vector generation process can be maintained to uphold stability in both training and inference phases. Moreover, thorough testing and validation on a separate dataset can help confirm that the generated vectors effectively encapsulate pertinent information and patterns within the data. This comprehensive approach can help ensure the reliability and stability of any AI system's overall performance, accuracy, and the like.

Additionally, it is noted that the various entities described herein—such as the AI models implemented by the user/query manager 110 and the digital asset manager 112—can undergo training using query-item pairs. In particular, positive samples can be derived from search logs, while negative samples can be randomly selected from both the digital assets 109 and the search logs. Moreover, incorporating log-based negative sampling can help prevent the models from favoring popular results consistently, as such results are prone to occur more frequently in the training data. In this regard, the embodiments effectively exercise contrastive learning, which can obviate the necessity for a balanced distribution of positive and negative samples.

It is noted that the foregoing description of AI-based approaches is not meant to be limiting, and that any number, type, form, etc., of AI-based (and/or non-AI-based) approaches can be utilized, at any level of granularity, to implement the techniques described herein, consistent with the scope of this disclosure.

Figure 3:
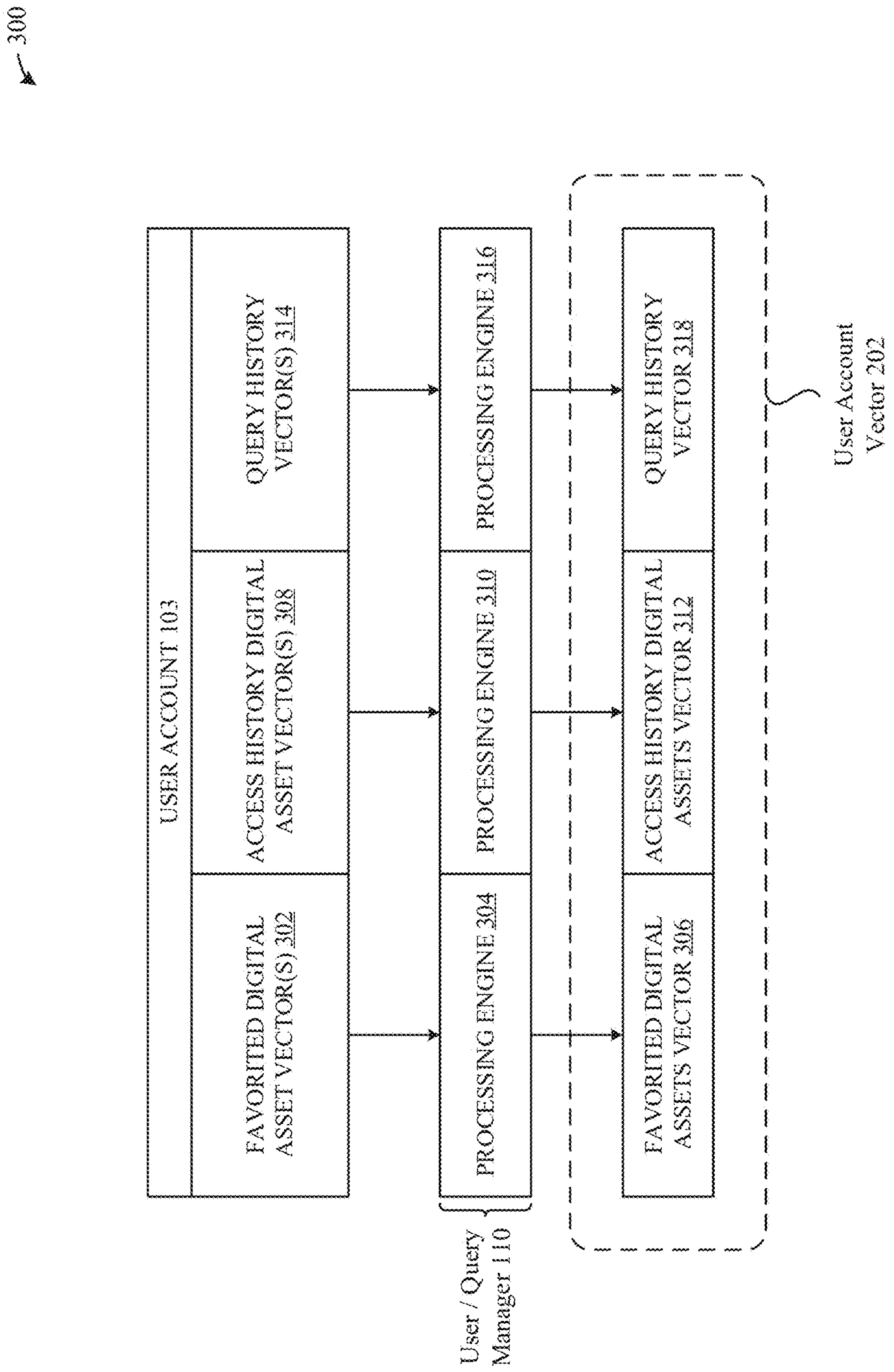
FIG. 3 illustrates a block diagram that provides examples of different aspects, characteristics, etc., of a user account that can be considered when generating a corresponding user account vector, according to some embodiments.

Returning now to FIG. 2—and, in accordance with the foregoing description of foundational embeddings, vectors, AI models, and so on—the user account vector 202 constitutes a mathematical representation of various aspects, characteristics, etc., of the user account 103. The block diagram 300 of FIG. 3 provides examples of different aspects, characteristics, etc., of the user account 103 that can be considered when generating the user account vector 202, according to some embodiments. In particular, the user account vector 202 can be based at least in part on vectors of digital assets 109 that have been favorited, liked, etc., in association with the user account 103 (illustrated in FIG. 3 as favorited digital asset vectors 302). The user account vector 202 can also be based at least in part on vectors of digital assets 109 that are frequently accessed on the client computing device 102 (illustrated in FIG. 3 as access history digital asset vectors 308). It is noted that the informational elements illustrated in FIG. 3, and on which the user account vector 202 is based, are not meant to be limiting, and that any amount, type, form, etc., of information associated with the user account 103, at any level of granularity, can be utilized when forming the user account vector 202.

As described below in conjunction with FIG. 5, the vector forms of the aforementioned digital assets 109 (i.e., 302 and 308) can be generated by the digital asset manager 112 (e.g., at the time the digital assets 109 are created, acquired, etc., at a time subsequent to the creation, acquisition, etc., of the digital assets 109, etc.), and the vector forms 302 and 308 can be provided to processing engines 304, and 310, respectively. Similarly, a vector form of the historical search queries received in association with the user account 103 (illustrated in FIG. 3 as query history vectors 314)—which can be generated in accordance with the techniques described below in conjunction with FIG. 4—can be provided to a processing engine 316. According to some embodiments, each of the processing engines 304, 310, and 316 can implement any number, type, form, etc. of operation(s), at any level of granularity, to effectively pool, into a single vector, the respective collection of vectors that the processing engine receives.

As a brief aside, it is noted that in the domain of foundational embeddings, the amalgamation of information from multiple vectors into a singular representative vector can be performed using various pooling techniques. Among these methods, average pooling constitutes a straightforward yet effective approach, given it effectively captures central tendencies by computing the mean of vector values. In contrast, max pooling can highlight dominant features by selecting the maximum value from each dimension, while min pooling can accentuate less-extreme aspects by extracting the minimum value. Sum pooling can offer insight into overall magnitude by evaluating the total sum of vector values. Weighted pooling can introduce a nuanced perspective by assigning distinct weights to vector elements, thereby enabling a more tailored representation. The introduction of Lp-norm pooling generalizes the process by introducing a parameter P for flexibility in capturing different vector aspects. Attention pooling, with its dynamic weight assignment based on relevance through attention mechanisms, can add an adaptive layer to the context of the data.

It is noted that the foregoing pooling examples are not meant to be limiting. It is additionally noted that one or more of the processing engines 304, 310, and 316 can implement transformer encoder networks that leverage any number, type, form, etc., of attention mechanisms to focus on specific parts of the vectors to reduce noise and to capture more pertinent information.

As shown in FIG. 3, the processing engine 304 generates a favorited digital assets vector 306 that is based at least in part on the one or more favorited digital asset vectors 302. Similarly, the processing engine 310 generates an access history digital assets vector 312 that is based at least in part on the one or more access history digital asset vectors 308. Similarly, the processing engine 316 generates a query history vector 318 that is based at least in part on the one or more query history vectors 314. According to some embodiments, the favorited digital assets vector 306, accessory history digital assets vector 312, and the query history vector 318 can be combined to form the user account vector 202 for the user account 103. For example, the favorited digital assets vector 306, accessory history digital assets vector 312, and the query history vector 318 can be concatenated (e.g., in the order illustrated in FIG. 3, or in any other order) to form the user account vector 202.

Accordingly, FIG. 3 illustrates an example approach for establishing, maintaining, etc., a user account vector 202 that corresponds to a user account 103. It should be understood that the approaches illustrated in FIG. 3 are not meant to be limiting in any way, and that other, additional, etc., aspects, characteristics, etc., of/associated with the user account 103, the digital assets 109, the search queries 108, etc., can be utilized to form the user account vector 202, consistent with the scope of this disclosure.

Figure 4:
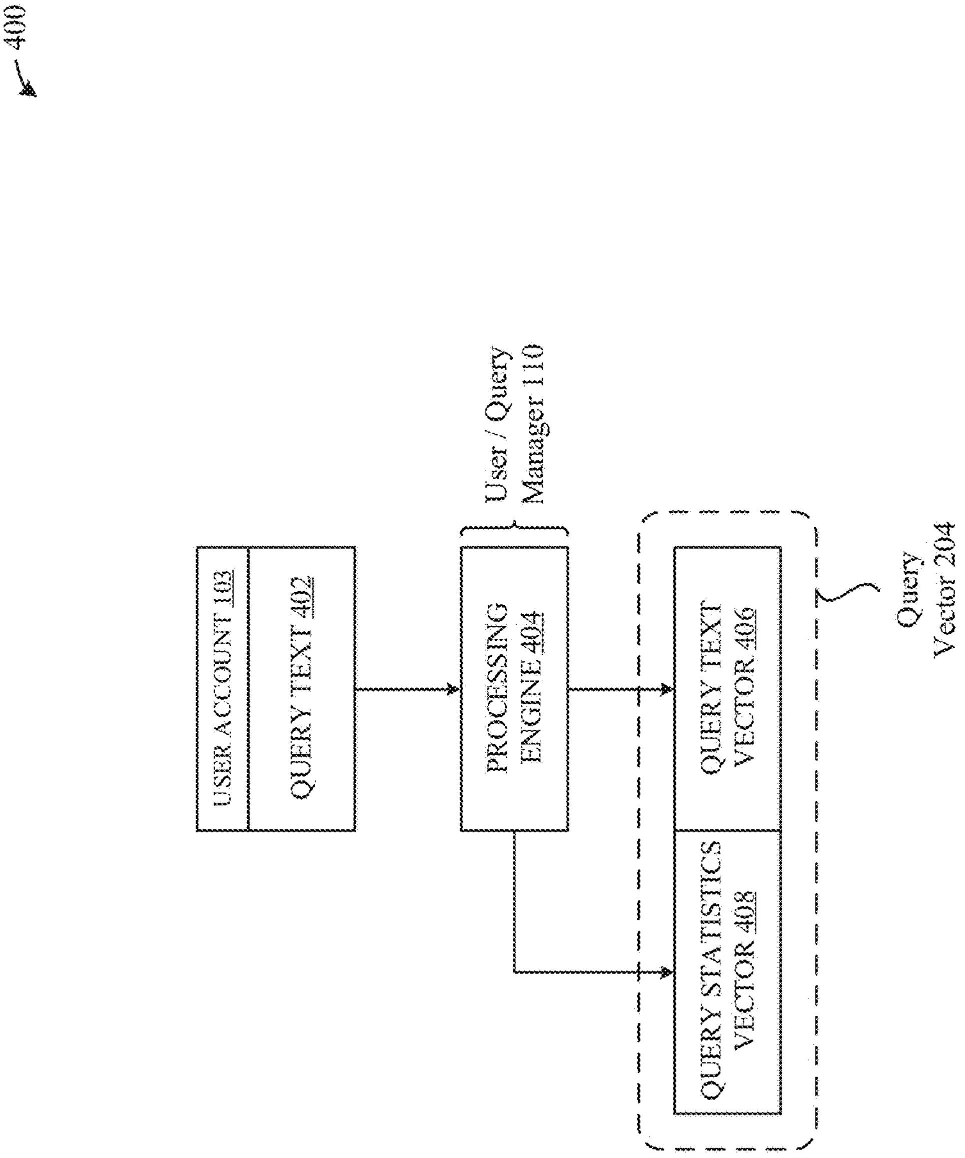
FIG. 4 illustrates a block diagram that provides an example approach for generating a query vector based on a search query, according to some embodiments.

Returning now to FIG. 2, the user/query manager 110 can also manage query vectors 204 for search queries received in association with the user account 103. The block diagram 400 of FIG. 4 provides an example approach for generating a query vector 204 based on a search query, according to some embodiments. As shown in FIG. 4, query text 402 can be received in association with the user account 103 (e.g., via a search query 108). According to some embodiments, a processing engine 404—e.g., one or more transformer-based large language models (LLMs)—can be utilized to generate a query text vector 406. The processing engine 404 can also be utilized to generate a query statistics vector 408 that complements the query text vector 406. For example, the query statistics vector 408 can be based on statistical attributes that correspond to the query text 402, such as a normalized frequency, conversion rates of the search query across distinct time windows, and so on. For example, the normalized frequencies can include a weekly query frequency, a monthly query frequency, a yearly query frequency, and the conversion rates can include a weekly query conversion rate, a monthly query conversion rate, a yearly query conversion rate. It is noted that the foregoing examples are not meant to be limiting, and that the normalized frequencies and conversion rates can include any amount, type, form, etc., of normalized frequencies and conversion rates, at any level of granularity, consistent with the scope of this disclosure.

As shown in FIG. 4, the query text vector 406 and the query statistics vector 408 can be combined to form the query vector 204 for the query text 402. For example, the query text vector 406 and the query statistics vector 408 can be concatenated (e.g., in the order illustrated in FIG. 4, or in any other order) to form the query vector 204. Accordingly, FIG. 4 illustrates an example approach for establishing, maintaining, etc., a query vector 204 that corresponds to query text 402. It should be understood that the approaches illustrated in FIG. 4 are not meant to be limiting in any way, and that other, additional, etc., aspects, characteristics, etc., of/associated with the query text 402 (and/or other information) can be utilized to form the query vector 204, consistent with the scope of this disclosure.

Returning now to FIG. 2, the user/query manager 110 can implement a user/query encoder 206 that receives, as an input, (1) the user account vector 202 (e.g., that corresponds to the user account 103 registered on the client computing device 102), and (2) a query vector 204 (e.g., that corresponds to a search query 108 provided by a user of the client computing device 102). In turn, the user/query encoder 206 can process the user account vector 202 and the query vector 204 to generate a user/query output vector 208. According to some embodiments, the user/query encoder 206 can combine (e.g., concatenate) the user account vector 202 and the query vector 204 to produce the user/query output vector 208. It is noted that the user/query encoder 206 can process the user account vector 202/query vector 204, at any level of granularity and using any number, type, form, etc., of operation(s), prior to/subsequent to combining the user account vector 202 and the query vector 204, consistent with the scope of this disclosure. As described in greater detail below, the user/query output vector 208 can be provided to the similarity analyzer 114 for additional processing.

As shown in FIG. 2, the digital asset manager 112 described above in conjunction with FIG. 1 can manage, for each digital asset 109, a respective (1) digital asset metadata vector 210, and (2) a respective digital asset content vector 212. The block diagram 500 of FIG. 5 provides examples of different aspects, characteristics, etc., of a given digital asset 109 that can be considered when generating the digital asset metadata vector 210 and the digital asset content vector 212 for the digital asset 109, according to some embodiments. In one example approach, the digital asset metadata vector 210 can be based on a source from which the digital asset 109 was created, acquired, etc., (e.g., an identifier of a software application 104 that manages the digital asset 109), which is illustrated in FIG. 5 as the digital asset source 502. The digital asset metadata vector 210 can also be based on a name of the digital asset 109 (e.g., a filename, a nickname, etc.), which is illustrated in FIG. 5 as the digital asset name 508. The digital asset metadata vector 210 can also be based on a type of the digital asset 109 (e.g., a file type, extension, etc.), which is illustrated in FIG. 5 as the digital asset type 514. The digital asset metadata vector 210 can also be based on a size of the digital asset 109 (e.g., file size information, dimension information, etc.), which is illustrated in FIG. 5 as the digital asset size 520. The digital asset metadata vector 210 can also be based on a date associated with the digital asset 109 (e.g., a creation date, access dates, etc.), which is illustrated in FIG. 5 as the digital asset date 526. It is noted that the different properties of the digital asset 109 illustrated in FIG. 5 are not meant to be limiting, and that any amount, type, form, etc., of information associated with the digital asset 109, at any level of granularity, can be considered when generating the digital asset metadata vector 210, consistent with the scope of this disclosure Additionally, it should be appreciated that different properties can be considered, analyzed, etc., depending on the nature of the digital asset 109 for which the digital asset metadata vector 210/digital asset content vector 212 are being generated. For example, when the digital asset 109 represents a song (i.e., audio) file, the properties can include the album, artist, title, track number, genre, year, duration, bitrate, sample rate, channels, composer, comment, copyright, encoder, language, publisher, original artist, album artist, disc number, lyrics, mood, tempo, key, ISRC (International Standard Recording Code), recording date, release date, label, BPM (beats per minute), performer, conductor, compilation, part of a set, podcast, podcast URL, podcast ID, podcast feed, episode number, episode ID, episode URL, cover art, custom tags, and the like. In another example, when the digital asset 109 represents an email, the properties can include the subject, sender, recipient, body, attachments, and the like. In yet another example, when the digital asset 109 represents a digital photograph, the properties can include the resolution, format, metadata, color space, bit depth, compression, layers (for layered formats like PSD), histogram, alpha channel (for transparent images), embedded color profile, location, and so on. In another example, when the digital asset 109 represents a log file for a mapping software application 104, the properties can include search queries, directions, places visited, route history, points of interest (POIs), user preferences, location history, interactions, feedback and ratings, synced devices, and so on.

It is noted that the foregoing examples are not meant to be limiting, and that the properties of a given digital asset 109 can include any amount, type, form, etc., of property/properties of the digital asset 109, at any level of granularity, consistent with the scope of this disclosure, when generating the digital asset metadata vector 210. It should also be appreciated that a respective rule set can be established for each type of digital asset 109 so that the relevant information can be gathered from the digital asset 109 and processed.

According to some embodiments, and as shown in FIG. 5, the digital asset source 502, digital asset name 508, digital asset type 514, digital asset size 520, and digital asset date 526 can be provided to the processing engines 504, 510, 516, 522, and 528, respectively, to generate a digital asset source vector 506, a digital asset name vector 512, a digital asset type vector 518, a digital asset size vector 524, and a digital asset date vector 530, respectively. According to some embodiments, the processing engines 504, 510, 516, 522, and 528 can implement any number of approaches for effectively generating vectors based on the inputs they receive. In particular, the processing engines 504, 510, 516, 522, and 528 can represent transformer-based LLMs that are specifically tuned to work with the types of inputs they receive. For example, the processing engines 504, 510, 516, 522, and 528 can implement the same or similar small-token LLMs given they receive similar text inputs (i.e., source, name, type, size, date) that are relatively small. Similarly, the processing engine 534—which, as described below, receives larger inputs (i.e., digital asset content 532 of the digital asset 109)—can implement a large-token LLM that is specifically designed to manage larger inputs, one or more pooling engines to pool segmented portions of the content (e.g., that have been vectorized by one or more LLMs), and so on. In any case, the digital asset source vector 506, digital asset name vector 512, digital asset type vector 518, digital asset size vector 524, and digital asset date vector 530 can be combined (e.g., concatenated) together to form the digital asset metadata vector 210.

Additionally, and as shown in FIG. 5, the digital asset content vector 212 can be based on the actual content of the digital asset 109 (illustrated in FIG. 5 as digital asset content 532). According to some embodiments, the digital asset content 532 can be pre-processed using any number, type, form, etc., of operation(s), at any level of granularity, prior to being provided to the processing engine 534. According to some embodiments, the processing engine 534 can implement any number of approaches for generating the digital asset content vector 212 based on the digital asset content 532. For example, when the digital asset 109 is an audio file, the processing engine 534 can implement a machine learning model-such as an audio encoding model-that generates the digital asset content vector 212 based on the content of the audio file. The audio encoding model can be configured to focus on, for example, the melody, harmony, rhythm, tempo, meter, lyrics, chorus, verse, bridge, dynamics, instrumentation, arrangement, key, harmonic progression, timbre, form, texture, style, emotion, production, hook, groove, transition, of the content of the audio file. In another example, when the digital asset 109 is a digital image file, the processing engine 534 can implement a machine learning model-such as a digital image model-that generates the digital asset content vector 212 based on the content of the digital image file. The digital image model can be configured to perform, for example, object recognition, scene understanding, semantic segmentation, object localization, image classification, text recognition (OCR), contextual understanding, geo-tagging, visual similarity, emotion recognition, etc., techniques on the content of the digital image. It is noted that the foregoing examples are not meant to be limiting, and that the digital asset content vector 212 can be based on any amount, type, form, etc., of characteristics of the digital asset 109/digital asset content 532, at any level of granularity, consistent with the scope of this disclosure. It is noted that the foregoing examples are not meant to be limiting, and that the processing engine 534 can be configured to implement any amount, type, form, etc., of AI-based/non-AI-based approaches, at any level of granularity, to establish the digital asset content vector 212 for the digital asset content 532 of a given digital asset 109, consistent with the scope of this disclosure.

Accordingly, FIG. 5 illustrates an example approach for establishing, maintaining, etc., a digital asset metadata vector 210 and a digital asset content vector 212 that corresponds to a digital asset 109. It should be understood that the approaches illustrated in FIG. 5 are not meant to be limiting in any way, and that other, additional, etc., aspects, characteristics, etc., of/associated with the digital asset 109 (and/or other information) can be utilized to form the digital asset metadata vector 210/digital asset content vector 212, consistent with the scope of this disclosure.

Returning now to FIG. 2, the digital asset manager 112 can implement a digital asset encoder 214 that receives, as an input for a given digital asset 109, (1) a digital asset metadata vector 210, and (2) a digital asset content vector 212. The digital asset manager 112 can receive the aforementioned inputs, for example, each time a digital asset 109 is received by the system 100 to be managed. In turn, the digital asset encoder 214 can process the digital asset metadata vector 210 and the digital asset content vector 212 to generate a digital asset output vector 216. According to some embodiments, the digital asset encoder 214 can combine (e.g., concatenate) the digital asset metadata vector 210 and the digital asset content vector 212 to generate the digital asset output vector 216. It is noted that the digital asset encoder 214 can process the digital asset metadata vector 210/digital asset content vector 212, at any level of granularity, using any number, type, form, etc., of operation(s), prior to/subsequent to combining the digital asset metadata vector 210 and the digital asset content vector 212, consistent with the scope of this disclosure. As described in greater detail below, the digital asset output vector 216 can be provided (along with the user/query output vector 208) to the similarity analyzer 114 for additional processing.

Accordingly, and as shown in FIG. 2, the similarity analyzer 114 can receive (1) a user/query output vector 208, and (2) one or more digital asset output vectors 216, with the task of generating respective similarity scores that represent an overall similarity between the user/query output vector 208 and the digital asset output vectors 216. In turn, the post-processing engine 116 can be configured to receive the digital asset output vectors 216, and to filter, order, etc., the digital asset output vectors 216 based at least in part on their respective similarity scores. The digital assets 109 that correspond to the filtered, ordered, etc., digital asset output vectors 216 can then be provided (e.g., via a user interface of the search application 106) in the form of search results 128. In turn, the search application 106 can enable a user to interact with the search results 128 (e.g., display expanded information for a given search result 128, load the software application 104/digital asset 109 associated with the search result 128, and so on).

Accordingly, FIGS. 2-5 provide an understanding of how the user/query manager 110, the digital asset manager 112, the similarity analyzer 114, and the post-processing engine 116 can function, interact with one another, etc., to generate search results 128 for search queries 108, according to some embodiments. A more detailed discussion of how these entities can function, interact with one another, etc., is discussed below in conjunction with FIGS. 6-8.

Figure 6A:
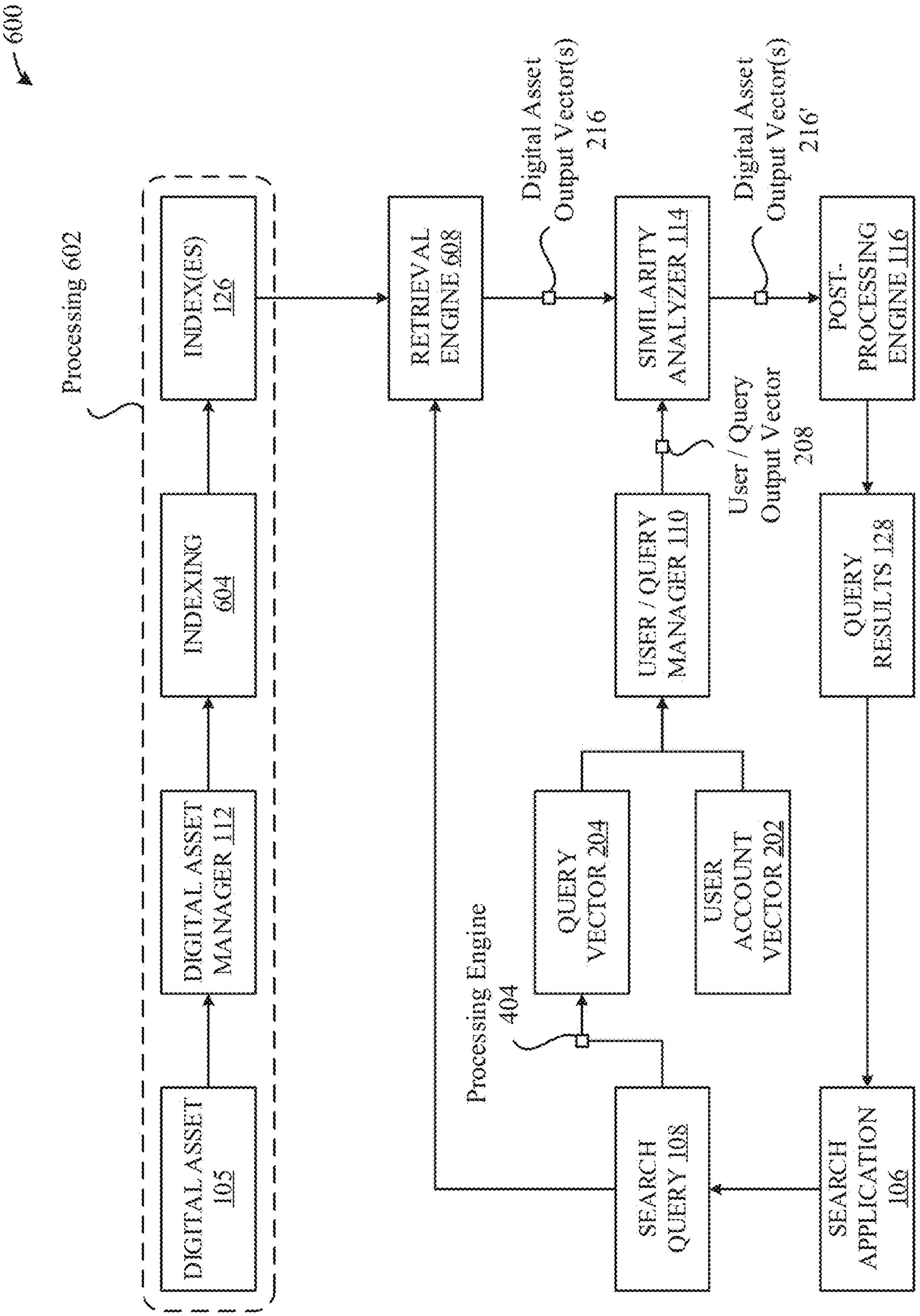
FIGS. 6A-6B illustrate block diagrams of example techniques for generating query results for a given search query, according to some embodiments.

FIG. 6A illustrates a block diagram 600 of how search results 128 can be generated for a given search query 108, according to some embodiments. As shown in FIG. 6A, a search application 106 executing on a client computing device 102 can receive a search query 108 (e.g., from a user operating the client computing device 102, from a software application 104 executing on the client computing device 102, etc.). The search query 108 can be, for example, "What is my Driver's License Number?". In response, the search application 106 can generate, retrieve, update, etc., the user account vector 202 that corresponds to a user account 103 that is registered on the client computing device 102 (e.g., in accordance with the techniques described above in conjunction with FIGS. 2-3). Additionally, the user/query manager 110—particularly, the processing engine 404 implemented by the user/query manager 110—can generate a query vector 204 based at least in part on the search query 108 (e.g., in accordance with the techniques described above in conjunction with FIGS. 2 and 4). The user/query manager 110—particularly, the user/query encoder 206—can then generate a user/query output vector 208 based on the user account vector 202 and the query vector 204 (e.g., in accordance with the techniques described above in conjunction with FIG. 2).

As a brief aside, it should be appreciated that the search application 106 can be configured to modify, expand on, etc., the search query 108 using keyword-based approaches. For example, the search application 106 can be configured to implement a machine learning model (e.g., an LLM) to expand the search query 108 "What is my Driver's License Number?" to include keywords that increase the likelihood of identifying digital assets 109 that are relevant to the search query 108. The keywords can include, for example, indications of software applications 104 that are likely to be associated with digital assets 109 that may contain the information that is being sought, such as "apps: photos, email, digital wallet, insurance." In another example, the keywords can include, for example, indications of keywords that likely have been associated with digital assets 109 (e.g., during the embedding processes described herein), such as "identification card, name, address." It is noted that the foregoing examples are not meant to be limiting, and that the search query 108 can be modified, expanded, etc., to incorporate any amount, type, form, etc., of information, at any level of granularity, to perform keyword-based adjustments, consistent with the scope of this disclosure.

Additionally, the search application 106 can be configured to modify, expand on, etc., the search query 108 using semantic-based approaches. For example, the search application 106 can be configured to implement a machine learning model (e.g., an LLM) to modify the search query 108 in a way that enables relevant digital assets 109 to be more effectively identified. For example, the search application 106 can modify the search query 108 "What is my Driver's License Number?" to read "Identify at least one photo of an identification card that is in landscape format, that includes at least one photograph and at least one holographic marking, and that includes bibliographic information such as a name, an address, and physical characteristics of a user." In another example, the search application 106 can modify the search query 108 to include "Find emails that reference the term 'Driver's License' and that include a string of eight characters where the first character is an alphanumeric character and the remaining seven characters are numerical characters" (e.g., when the search application 106 is aware that the user account 103 is associated with a user who resides in California). It is noted that the foregoing examples are not meant to be limiting, and that the search query 108 can be modified, expanded, etc., to incorporate any amount, type, form, etc., of information, at any level of granularity, to perform semantic-based adjustments, consistent with the scope of this disclosure.

It should be appreciated that the keyword/semantic-based approaches for modifying, expanding on, etc., the search query 108 can be utilized to yield a single updated search query 108, or two or more updated search queries 108, consistent with the scope of this disclosure. In this regard, although the search query 108 is described in a singular capacity, it should be appreciated that the search query 108 can effectively incorporate one or more search queries that can be processed in individual or combined capacities, consistent with the scope of this disclosure.

As shown in FIG. 6A, processing 602 can be performed by the client computing device 102 on a routine, responsive, etc., basis. According to some embodiments, processing 602 can represent any number, type, form, etc., of operation(s), at any level of granularity, involved in generating, retrieving, storing, etc., information about the digital assets 109 (e.g., as they are created, acquired, etc., and in turn are to be managed by the client computing device 102). For example, the processing 602 can include the digital asset manager 112 generating digital asset output vectors 216 for digital assets 109 (e.g., as described above in conjunction with FIG. 2). The processing 602 can also include performing indexing operations 604 for the digital assets 109, which—as described herein, can include establishing search-related information (keyword/semantic based adjustments/expansions)—for effectively registering, storing, etc., the digital assets 109 within one or more of the indexes 126. The search-related information can be established using any known approach, e.g., one or more LLM models can be utilized to generate, for a given digital asset 109, keyword-based information that is relevant to the digital asset 109, semantic-based information that is relevant to the digital asset 109, and so on. In this manner, information included in search queries 108-such as text, images, audio, video, etc.-can be referenced against the indexes 126 to identify digital assets 109 that are relevant to the search query 108.

Accordingly, and as shown in FIG. 6A, a retrieval engine 608 implemented by the client computing device 102 can be configured to receive the search query 108. In turn, the retrieval engine 608 can interface with the indexes 126 to identify digital assets 109 that are relevant to the search query 108 using keyword-based approaches and/or semantic-based approaches. According to some embodiments, the retrieval engine 608 can implement any number, type, form, etc., of additional operations on the search query 108 prior to interfacing with the indexes 126. For example, the retrieval engine 608 can implement one or more LLMs that reorganize, supplement, etc., the search query 108 to enhance the overall accuracy by which the search query 108 maps to digital assets 109 managed by the indexes 126.

Figure 6B:
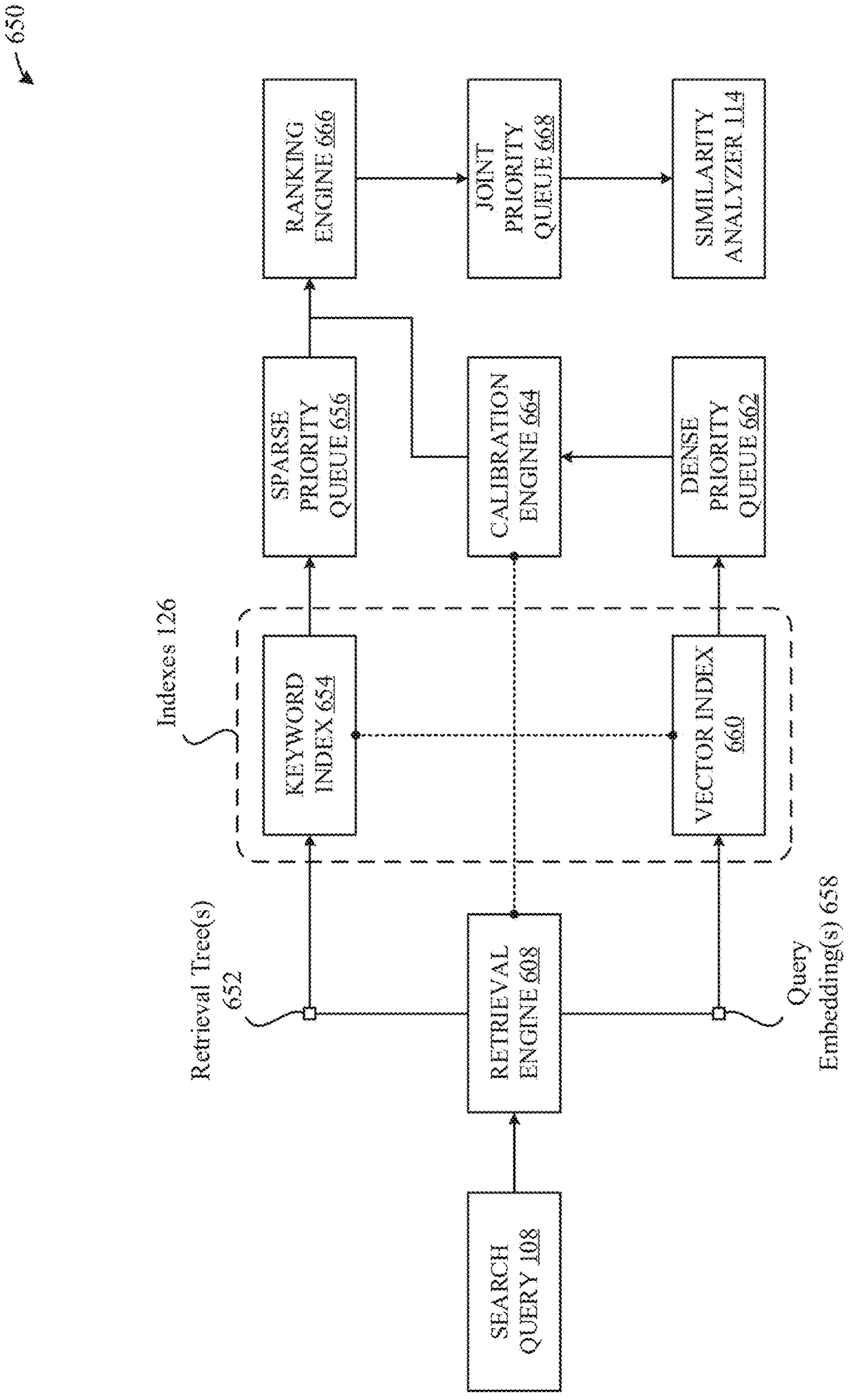

FIG. 6B provides a more detailed breakdown of the manner in which the retrieval engine 608 interfaces with the indexes 126, according to some embodiments. As shown in FIG. 6B, the retrieval engine 608 can perform a keyword-based search against one or more keyword indexes 654. According to some embodiments, to perform the keyword-based search, the retrieval engine 608 can begin by generating one or more retrieval trees 652 based on the search query 108, the user account 103, and/or any other relevant information. In the context of FIG. 6B, the retrieval trees 652 represent data structures designed for the efficient storage and retrieval of sets of strings, such as keywords included in the search query 108. Consider, for example, a scenario where the search query 108 includes the text "What time is my flight tomorrow?". In this example, the retrieval engine 608 can begin by tokenizing the search query 108, which involves breaking down the search query 108 into individual keywords or phrases. In particular, the search query 108 can be tokenized into the keywords ["what", "time", "is", "my", "flight", "tomorrow"]. Each of these keywords can then be inserted into its own retrieval tree 652, character by character, thereby resulting in multiple retrieval trees 652. For instance, the keyword "what" would result in a retrieval tree 652 where the root node branches out to nodes representing 'w', 'h', 'a', and 't' sequentially. Similarly, separate retrieval trees 652 would be constructed for the keywords "time", "is", "my", "flight", and "tomorrow", each forming its own unique tree structure. It is noted that the foregoing approaches are not meant to be limiting, and that the search query 108 can be tokenized using any approach, at any level of granularity, consistent with the scope of this disclosure.

After the retrieval trees 652 are generated, they can be compared against one or more keyword indexes 654. According to some embodiments, a given keyword index 654 associates each digital asset 109 with its relevant keywords. The keyword index 654 can be established/updated, for example, in conjunction with digital assets 109 being obtained, updated, etc., on the client computing device 102. According to some embodiments, the keyword index 654 can be implemented as a hash map, where each key is a keyword, and the corresponding value is a list of identifiers (IDs) of digital assets 109 that have been tagged with that keyword. For example, the keyword index 654 might contain entries such as "what": [digital_asset_1, digital_asset_5], "time": [digital_asset_2, digital_asset_4], "is": [digital_asset_3, digital_asset_5], "my": [digital_asset_1, digital_asset_3], "flight": [digital_asset_2, digital_asset_5], and "tomorrow": [digital_asset_4, digital_asset_5]. In this regard, the keyword index 654 can be utilized to efficiently identify digital assets 109 based on keywords associated therewith. It is noted that the utilization of hash maps is not meant to be limiting, and that the keyword index 654 can be implemented using any approach for effectively associating keywords with digital assets 109, consistent with the scope of this disclosure. It is additionally noted that digital assets 109 can be associated with any number of keywords, such as synonyms of keywords associated with the digital assets 109, keywords that are deemed to be associated with the digital assets 109, and so on.

According to some embodiments, to identify digital assets 109 using the retrieval trees 652, each retrieval tree 652 can be traversed to generate all possible prefixes/complete keywords that the retrieval tree 652 contains. For each generated keyword, the keyword index 654 can be queried to retrieve the associated digital asset 109 IDs. For example, traversing the retrieval tree 652 for "what" yields the keyword "what"—which, when looked up in the keyword index 654 under the foregoing example, returns [digital_asset_1, digital_asset_5]. Similarly, traversing the retrieval tree 652 for "time" yields "time", which returns [digital_asset_2, digital_asset_4]. This process can be repeated for each keyword in the search query 108, thereby generating lists of digital asset 109 IDs that are associated with each keyword.

A next step can involve aggregating the results to identify all digital assets 109 that are associated with any of the keywords from the search query 108. For example, the keyword "what" returns [digital_asset_1, digital_asset_5], "time" returns [digital_asset_2, digital_asset_4], "is" returns [digital_asset_3, digital_asset_5], "my" returns [digital_asset_1, digital_asset_3], "flight" returns [digital_asset_2, digital_asset_5], and "tomorrow" returns [digital_asset_4, digital_asset_5]. When the results are aggregated, it can be found that digital_asset_1 is tagged with "what" and "my", digital_asset_2 with "time" and "flight", digital_asset_3 with "is" and "my", digital_asset_4 with "time" and "tomorrow", and digital_asset_5 with "what", "is", "flight", and "tomorrow". In this manner, the digital assets 109 that are most relevant to the search query 108 can effectively be determined based on the number of matching keywords. Moreover, a respective score can be assigned to each digital asset 109, e.g., based on the number of matching keywords, and/or any other information, at any level of granularity, to effectively quantify a keyword-based relevance of the digital asset 109 to the search query 108.

In summary, by constructing retrieval trees 652 from the search query 108 and using the retrieval trees 652 to traverse the keyword index 654, digital assets 109 tagged with the keywords included in the search query 108 can be efficiently identified. This approach leverages the retrieval tree 652 data structure's efficiency in handling prefix searches, thereby ensuring quick and effective keyword matching in large datasets. In this regard, the conversion of a search query 108 into retrieval trees 652 and their utilization in keyword indexes 654 facilitates the efficient identification of relevant digital assets 109 based on keyword matching.

As shown in FIG. 6B, the digital assets 109 identified by way of the retrieval trees 652/keyword indexes 654 can be provided to a sparse priority queue 656. In turn, and as described below in greater detail, the digital assets 109 included in the sparse priority queue 656 can be subsequently processed by a ranking engine 666.

Additionally, as shown in FIG. 6B, the retrieval engine 608 can perform a semantic-based search against one or more vector indexes 660. According to some embodiments, to perform the semantic-based search, the retrieval engine 608 can begin by generating one or more query embeddings 658 based on the search query 108, the user account 103, and/or any other relevant information. Consider the same/foregoing example scenario, where the search query 108 includes the text "What time is my flight tomorrow?". In this example, generating the query embeddings 658 can begin with the process of tokenization, which involves breaking down the search query 108 into individual words or phrases such as ["what", "time", "is", "my", "flight", "tomorrow"]. Subsequently, each token/the search query 108 as a whole can be converted into query embeddings 658 (i.e., vector embeddings) using a pre-trained model, e.g., Unified Embedding, BERT, word2vec, etc. In this regard, the query embeddings 658 represent high-dimensional vectors that capture the semantic meaning of the tokens included in the search query 108/the search query 108 as a whole.

After the query embeddings 658 are generated, they can be compared against one or more vector indexes 660. According to some embodiments, a given vector index 660 associates each digital asset 109 with one or more vector embeddings that correspond to the digital asset 109. The vector index 660 can be established/updated, for example, in conjunction with digital assets 109 being obtained, updated, etc., on the client computing device 102. According to some embodiments, the vector index 660 can be implemented using specialized data structures, e.g., Hierarchical Navigable Small World (HNSW), Approximate Nearest Neighbor (ANN), etc., approaches, to enable efficient nearest-neighbor searches to be performed.

To identify digital assets 109 that are relevant to the search query 108, the query embeddings 658, one or more embeddings derived from the query embeddings 658, etc., can be compared to the digital asset 109 embeddings stored in the vector index 660 using similarity measures, e.g., cosine similarity, Euclidean distance, etc. In this manner, digital assets 109 whose embeddings are closest to the query embedding(s) 658 in the semantic space are considered to be the most relevant. For instance, if the query embedding(s) 658 closely matches digital asset 109 embeddings for flight itineraries or schedules, those digital assets 109 will be identified as relevant. According to some embodiments, a respective score can be assigned to each digital asset 109, e.g., based on its semantic relevance to the search query 108, and/or any other information, at any level of granularity, to effectively quantify a semantic-based relevance of the digital asset 109 to the search query 108.

Accordingly, the semantic-based approach can leverage the advanced capabilities of machine learning models to understand and match the semantic content of search queries 108 and digital assets 109. For example, after tokenizing and embedding the search query 108 "What time is my flight tomorrow?", the resulting query embedding(s) 658 might be compared against embeddings for digital assets 109 that include the text "Flight schedule for tomorrow", "My flight details", "My flight itinerary", etc. Similarity calculations, such as cosine similarity, can help identify the digital assets 109 that are most relevant based on their semantic proximity to the query embedding. By ranking digital assets 109 according to these similarity scores, the most relevant digital assets 109 can be efficiently identified.

As shown in FIG. 6B, the digital assets 109 identified by way of the query embeddings 658/vector indexes 660 can be provided to a dense priority queue 662. In turn, and as described below in greater detail, the digital assets 109 included in the sparse priority queue 656 can be subsequently processed by a calibration engine 664/ranking engine 666.

According to some embodiments, it can be desirable to combine the digital assets 109 included in the sparse priority queue 656/dense priority queue 662 into a single collection of digital assets 109 that are most relevant to the search query 108. However, as described herein, the sparse priority queue 656 includes digital assets 109 with respective scores that are based on the keyword-based search approaches described herein, whereas the dense priority queue 662 includes digital assets 109 with respective scores that are based on the semantic-based search approaches described herein. In this regard, due to the differences in the approaches used to the score the digital assets 109 in the sparse priority queue 656 versus the digital assets 109 in the dense priority queue 662, it can be beneficial to adjust, calibrate, etc., the scores of the digital assets 109 in the sparse priority queue 656 and/or the dense priority queue 662.

In the example illustrated in FIG. 6B, a calibration engine 664 can be implemented to adjust, calibrate, etc., the scores of the digital assets 109 in the dense priority queue 662 (while leaving the scores associated with the digital assets 109 in the sparse priority queue 656 intact). According to some embodiments, when adjusting, calibrating, etc., the respective score of a given digital asset 109, the calibration engine 664 can implement one or more machine learning models to effectively analyze the search query 108, the digital asset 109, the respective score, and/or any other relevant information, to effectively adjust, calibrate, etc., the respective score to align with the keyword-based scoring system used to score the digital assets 109 in the sparse priority queue 656. It is noted that the foregoing examples are not meant to be limiting, and that the calibration engine 664 can adjust, calibrate, etc., the respective scores of the digital assets 109 included in the dense priority queue 662 based on any amount, type, form, etc., of information, at any level of granularity, consistent with the scope of this disclosure. It is additionally noted that non-machine-learning (i.e., rules-based) approaches can be utilized to achieve the same or similar calibration results.

Accordingly, when the calibration engine 664 has effectively adjusted, calibrated, etc., the scores of the digital assets 109 included in the dense priority queue 662, the digital assets 109 included in the sparse priority queue 656 and the dense priority queue 662 can be provided to a ranking engine 666. According to some embodiments, the ranking engine 666 can implement one or more machine learning models to effectively analyze the search query 108, digital assets 109, the respective scores of the digital assets 109, and/or any other relevant information, to effectively rank (i.e., order) the digital assets 109 that are most relevant to the search query 108, the context(s) under which the search query 108 is/are provided, and so on. For example, the ranking engine 666 can be configured to analyze the age of the digital assets 109, the utilization rates of the digital assets 109, the areas in which relevant information was identified within the digital assets 109, and so on, to effectively adjust the respective scores of the digital assets 109 where appropriate. It is noted that the foregoing examples are not meant to be limiting, and that the ranking engine 666 can be configured to effectively rank the digital assets 109 included in the sparse priority queue 656 and/or dense priority queue 662 based on any amount, type, form, etc., of information, at any level of granularity, consistent with the scope of this disclosure. It is additionally noted that non-machine-learning (i.e., rules-based) approaches can be utilized to achieve the same or similar ranking results.

According to some embodiments, the ranking engine 666 can be configured to disregard digital assets 109 having respective scores that do not satisfy a threshold value, disregard digital assets 109 that are not ranked within a threshold position (e.g., disregard all digital assets 109 that are ranked $11^{th}$ or more), and so on. It is noted that the foregoing examples are not meant to be limiting, and that the ranking engine 666 can be configured to implement any number, type, form, etc., of ranking approaches, filtering approaches, etc., based on any amount, type, form, etc., of information, at any level of granularity, consistent with the scope of this disclosure. In any case, and as shown in FIG. 6B, the ranking engine 666 can output the ranked, filtered, etc., digital assets 109 to a joint priority queue 668.

As described herein, the digital assets 109 identified by the retrieval engine 608 (and stored in the joint priority queue 668) can be ordered based on the respective strengths by which the digital assets 109 match the search query 108 (referred to herein as an initial ordering). In turn, the retrieval engine 608 can obtain digital asset output vectors 216 (that are generated by way of the processing 602 and that correspond to the identified digital assets 109), and can provide the digital asset output vectors 216 to the similarity analyzer 114. According to some embodiments, the retrieval engine 608 can be configured to modify, supplement, etc., the digital asset output vectors 216 prior to providing the digital asset output vectors 216 to the similarity analyzer 114. For example, the retrieval engine 608 can modify the digital asset output vectors 216 to account for changes in the frequencies of utilization of the corresponding digital assets 109 that have taken place since the digital asset output vectors 216 were first generated (that are not reflected in the (unmodified) digital asset output vectors 216).

According to some embodiments, the similarity analyzer 114, upon receiving the user/query output vector 208 and the digital asset output vectors 216, can begin generating, for each digital asset output vector 216, a respective similarity score that represents an overall similarity between the user/query output vector 208 and the digital asset output vector 216. As described herein, the respective similarity score for a given digital asset output vector 216 can be generated by the similarity analyzer 114 using any approach(es) for analyzing similarities between vectors, e.g., Cosine Similarity operations. In this regard, and turning back now to FIG. 6A, the similarity analyzer 114 can output, to the post-processing engine 116, digital asset output vectors 216', which represent digital asset output vectors 216 that have been tagged with, associated with, etc., respective similarity scores (relative to the user/query output vector 208). It is noted that information can be removed from the digital asset output vectors 216' such that only digital asset 109 identifiers and respective similarity scores remain, thereby improving overall data transfer efficiencies.

Additionally, and as previously described herein, the post-processing engine 116 can implement a machine learning model (e.g., an LLM) to effectively determine whether the search query 108 includes one or more questions to which one or more answers should be provided. In particular, when a question is identified, the post-processing engine 116 can be configured to (e.g., using the LLM) analyze the digital assets 109 that correspond to the digital asset output vectors 216' to generate an answer. Consider, for example, the search query 108 described in conjunction with FIG. 6A ("What is my Driver's License Number?"). In this example, the post-processing engine 116 can analyze one or more of aforementioned digital assets 109—e.g., the metadata associated therewith, the content thereof, etc.—to identify a Driver's License Number that corresponds to the user associated with the user account 103. For example, the digital assets 109 may include a digital image of the user's Driver's License, an email between the user and their car insurance carrier (where the email references the Driver's License Number), and a digital wallet software application 104 that includes/manages a digital version of the user's Driver's License. Accordingly, the post-processing engine 116 can parse the digital image (e.g., OCR information that includes the Driver's License Number) to extract the Driver's License Number, parse the body text of the email to extract the Driver's License Number, and/or interface with the digital wallet software application 104 to extract the Driver's License Number. In turn, the post-processing engine 116 can compare/reconcile the extracted information to identify whether the Driver's License Number satisfies a threshold level of probability as constituting an accurate answer to the question. It is noted that the foregoing examples are not meant to be limiting, and that the post-processing engine 116 can identify any amount, type, form, etc., of questions included in a given search query 108, at any level of granularity, consistent with the scope of this disclosure. It is also noted that the post-processing engine 116 can process any amount, type, form, etc., of digital assets 109, at any level of granularity, to effectively extract relevant information that can be used to formulate answers to the questions, consistent with the scope of this disclosure.

Additionally, and as previously discussed herein, the post-processing engine 116 can be configured to filter, order, etc., the digital asset output vectors 216' based at least in part on their respective similarity scores, such that the corresponding digital assets 109 are ordered based on the user/query output vector 208—i.e., ordered from most/least relevant to both the user account 103 and the search query 108 (referred to herein as a personalized ordering). Accordingly, the initial ordering of the digital assets 109 (provided by the retrieval engine 608) can differ from the personalized ordering. In this regard, the personalized ordering can be beneficial in that it differs from what would ordinarily be provided by the retrieval engine 608 (absent any influence from what is known to be relevant to the user account 103 (as provided by the user/query output vector 208)). It should also be appreciated that when the post-processing engine 116 is tasked with providing at least one answer to at least one question included in the search query 108, the post-processing engine 116 can further-reorder the digital assets 109, e.g., in order from most relevant to least relevant with respect to providing the answers being sought by the user.

As a brief aside, it should be appreciated that when the post-processing engine 116 establishes an answer to a given question—but the answer does not satisfy a threshold level of confidence, correctness, etc.—the post-processing engine 116 can be configured to carry out additional tasks. For example, the post-processing engine 116 can be configured to interface with one or more partner computing devices 130—which, as described herein, may have higher processing capacities than the client computing device 102—for assistance in identifying digital assets 109 that are relevant to the search query/question, generating an answer to the question, and so on, consistent with the techniques described herein. In another example, the post-processing engine 116 can be configured to utilize different approaches—e.g., different rules-based algorithms, machine learning models, etc.—in attempt to mitigate the foregoing issues. In another example, if the post-processing engine 116 is unable to identify relevant digital assets 109, generate an answer that satisfies the aforementioned threshold, etc., then the post-processing engine 116 can provide an affordance that explains the nature of the issue and provides recommendations on how to remedy the issue. For example, if the question is about the check-in time for an upcoming hotel reservation, and the post-processing engine 116 is able to find an email from the hotel—but not a specification of the check-in time—then then post-processing engine 116 can identify contact information for the hotel and enable the user to connect with the hotel to obtain the information (e.g., placing a phone call, creating a draft email addressed to the hotel's customer service department, performing a web search for the hotel/check-in time, etc.). It is noted that the foregoing examples are not meant to be limiting, and that the post-processing engine 116 can be configured to take any number, type, form, etc., of action(s), at any level of granularity, consistent with the scope of this disclosure.

When the post-processing engine 116 has successfully obtained, processed, and ordered the digital assets 109—as well as generated answers to any questions included in the search query 108—the post-processing engine 116 can output search results 128 to the search application 106. As previously described herein, the search results 128 can include any amount of information related to the digital assets 109, the questions/answers, and so on. For example, the search results 128 can include answer information—e.g., "Based on photos, emails, and your digital wallet, your Driver's License Number appears to be D1234567"—that can be output via a user interface of the search application 106. In another example, the search results 128 can include metadata information associated with the digital assets 109 that enables a user interface on the client computing device 102 to render affordances for the digital assets 109. A user of the client computing device 102 can utilize the affordances to interact with the digital assets 109. For example, an affordance for a given digital asset 109 can include information about the software application 104 that manages the digital asset 109, information about portions of the digital asset 109 that are relevant to the search query 108, and so on, and can enable a user to access the software application 104/digital asset 109, expand on the aforementioned information, and so on. An example approach for implementing user interfaces is provided below in conjunction with FIG. 7.

Figure 7:
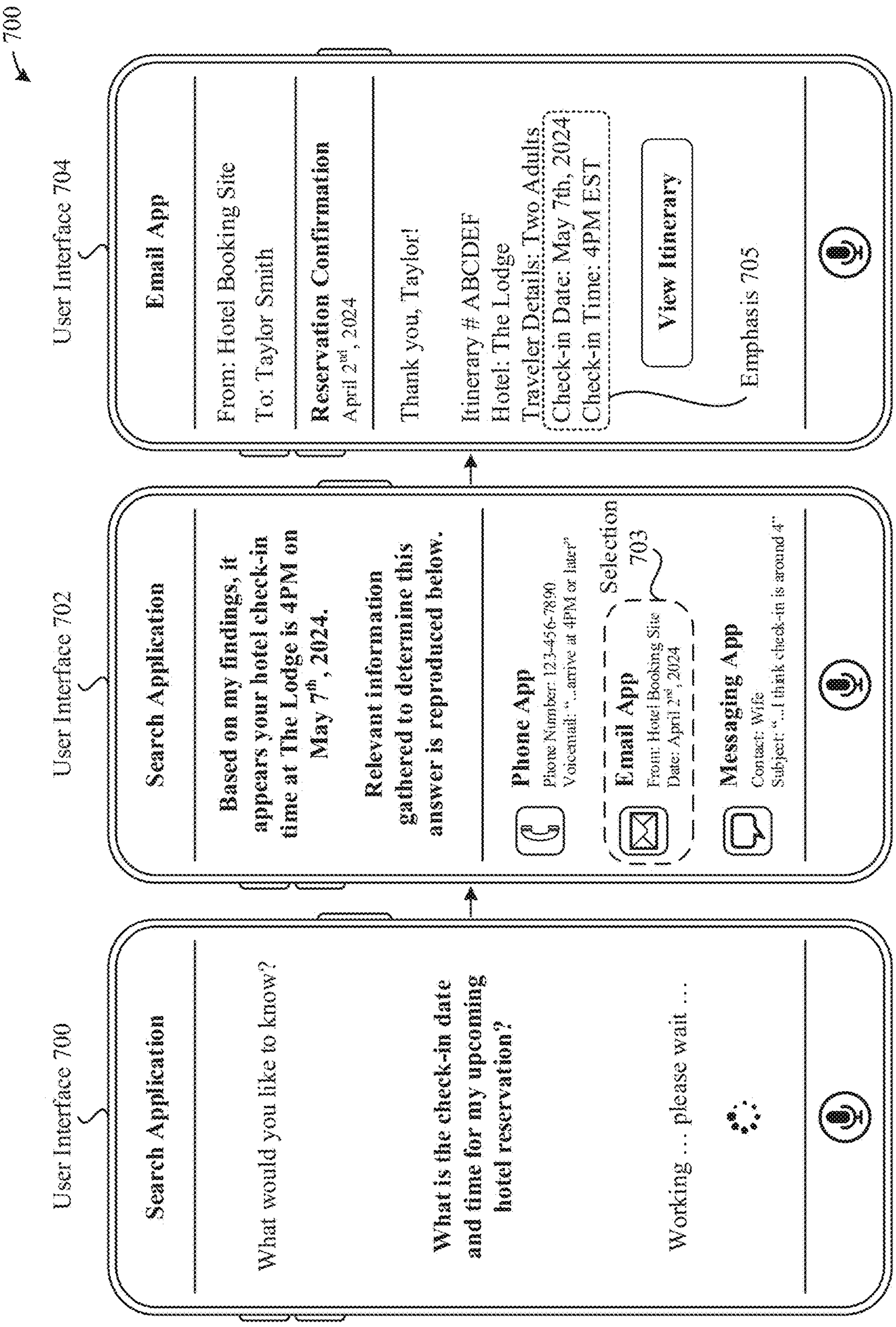
FIG. 7 sets forth a conceptual diagram of user interfaces that can be implemented to display search results for a given search query, according to some embodiments.

FIG. 7 sets forth a conceptual diagram 700 of user interfaces that can be implemented to display search results 128 for a given search query 108, according to some embodiments. As shown in FIG. 7, a user interface 700 can represent the search application 106 as it is receiving and processing a search query 108 on the client computing device 102. In particular, the search query 108 includes the language "What is the check-in date and time for my upcoming hotel reservation." In turn, the various entities described herein can carry out the processes described in conjunction with FIGS. 2-6 to effectively (1) identify digital assets 109 that are relevant to the search query 108, (2) identify that the search query 108 includes a specific question for which an answer is being sought (rather than, for example, simply asking to see digital assets 109 that are relevant to the search query 108), and (3) generate an answer to the specific question, and (4) generate search results 128 that include the digital assets 109 (or references thereto), the answer to the question, and any other relevant/useful information.

As shown in FIG. 7, the search application 106 can, in conjunction with receiving the search results 128, display a user interface 702 that includes an affordance for the answer, as well as affordances for the digital assets 109 that are relevant to the search query 108/answer. As shown in FIG. 7, the answer affordance can include information about the hotel, information about the check-in time that was identified, and a description about how the answer was determined using the digital assets 109. In the example illustrated in FIG. 7, the digital assets 109 include a voicemail (managed by a Phone App) that includes information about arriving at 4 PM or later, an email (managed by an Email App) from Hotel Booking Site that includes information about the check-in time, and a message (managed by a Messaging App) between the user and their spouse about what is understood to be the check-in time. Again, it should be appreciated that the digital assets 109 illustrated in FIG. 7/described herein are merely exemplary, and that other digital assets 109 can be identified, analyzed, etc., at any level of granularity, in attempt to identify an answer to the question included in the search query 108.

Additionally, and as shown in FIG. 7, the digital asset 109 affordances can include information about software applications 104 that correspond to the digital assets, as well as relevant information extracted from, derived from, etc., the digital assets 109. The digital asset 109 affordances can also enable selections of the affordances to be made. For example, as shown in FIG. 7, a selection 703—which constitutes a request to load the email software application 104 and the relevant digital assets 109 (i.e., email(s))—can cause the search application 106 to load the email software application 104 and the relevant emails, which is reflected in the user interface 704. Additionally, the search application 106 can provide information to the email software application 104 to enable the software application 104 to emphasize areas of the email that were relevant to the search query 108/question included therein, which is reflected as emphasis 705 in FIG. 7.

It should be appreciated that the user interfaces illustrated in FIG. 7 are merely exemplary and that they should not be construed as limiting. To the contrary, search application 106 can be configured to output any amount, type, form, etc., of user interface(s), including any amount, type, form, etc., of information related to the search query 108, search results 128, etc.—at any level of granularity—consistent with the scope of this disclosure.

Figure 8A:
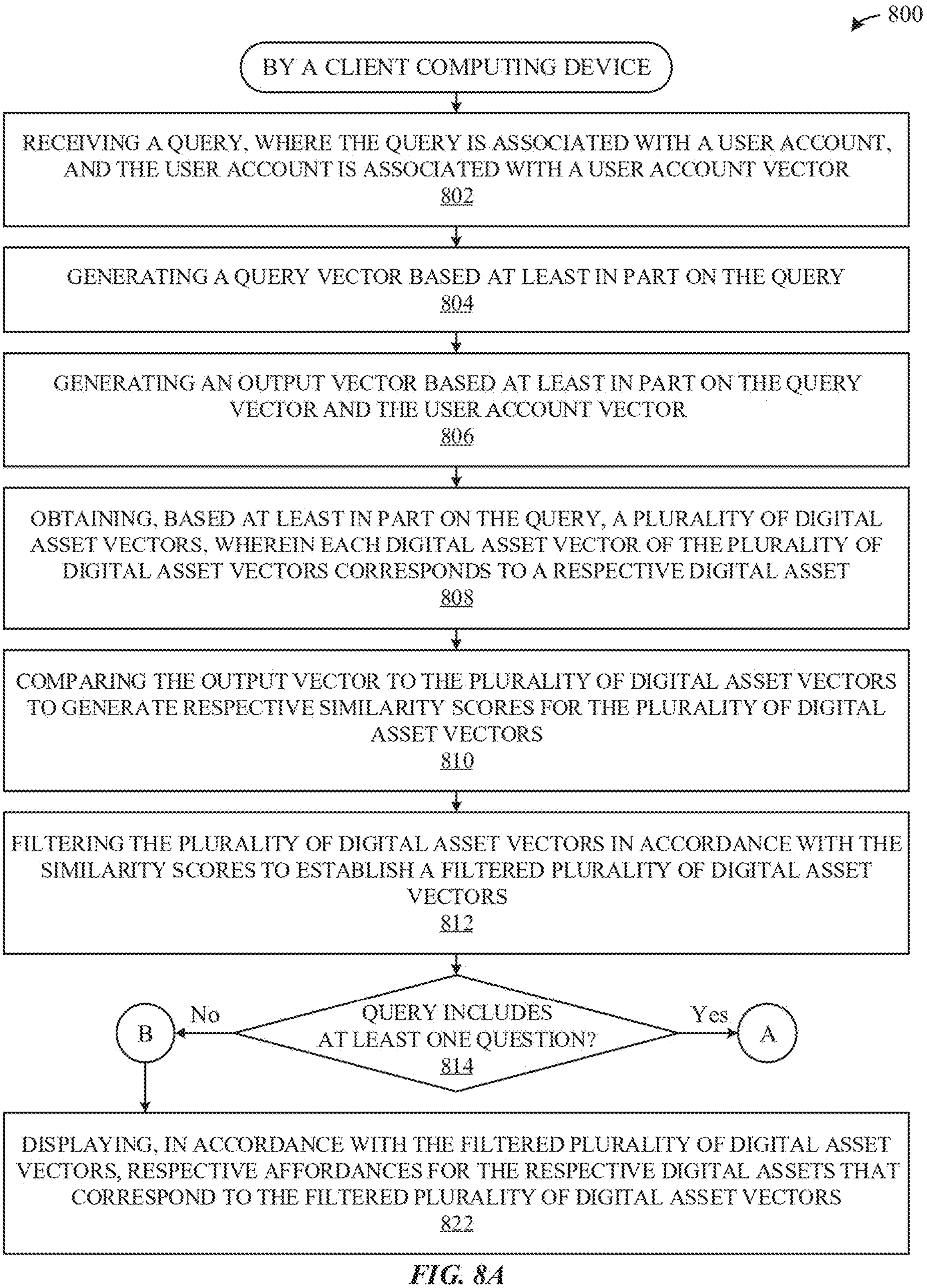
FIGS. 8A-8B illustrate a method for providing relevant search results for search queries, according to some embodiments.
Figure 8B:
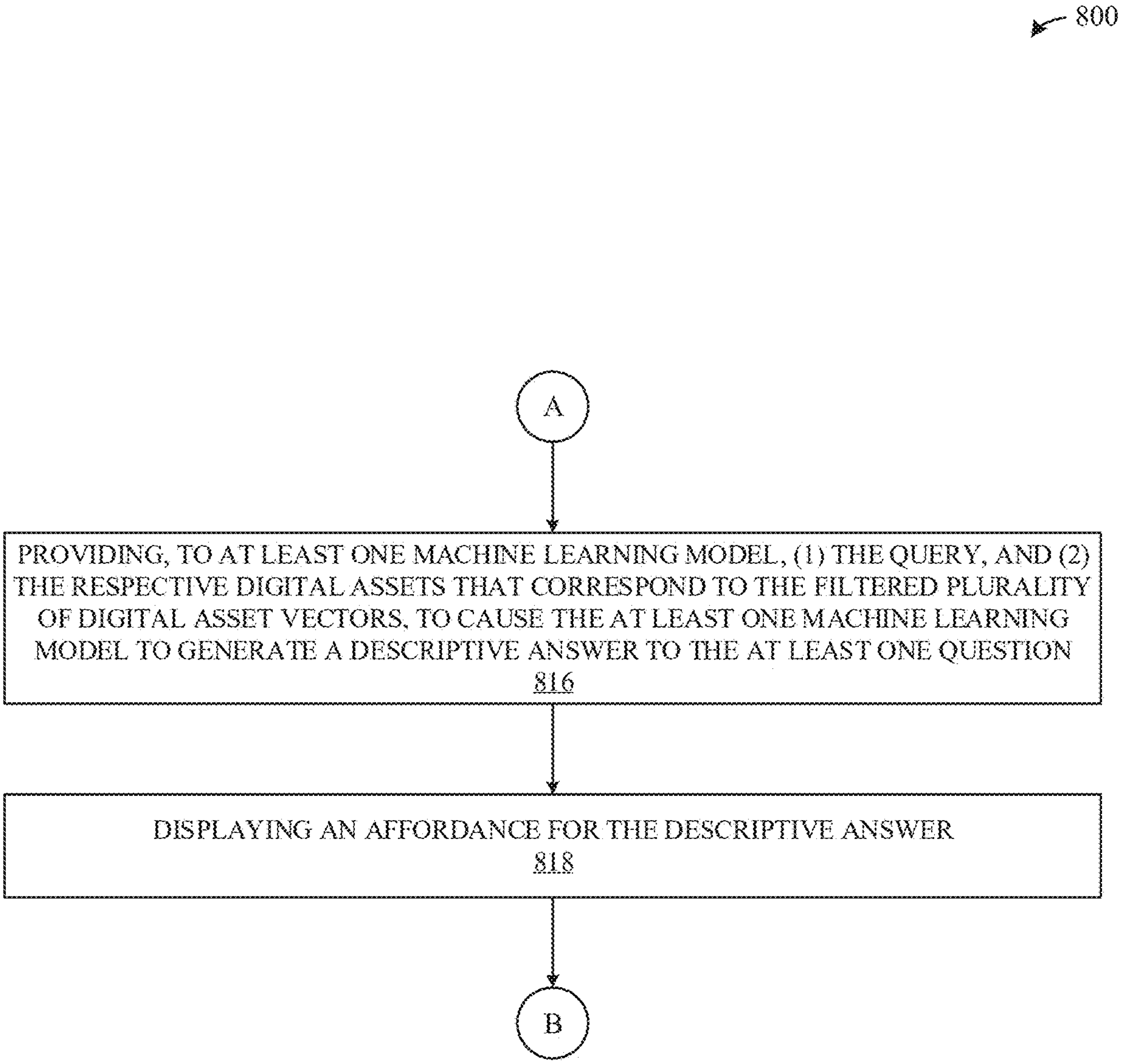

Accordingly, FIGS. 6-7 provide overview of how search results 128 can be generated for different types of search queries 108, according to some embodiments. Additionally, FIGS. 8A-8B illustrate a method 800 for providing relevant search results for search queries, according to some embodiments. As shown in FIG. 8A, the method 800 begins at step 802, and involves the client computing device 102 receiving a query, where the query is associated with a user account, and the user account is associated with a user account vector (e.g., as described above in conjunction with FIGS. 1-7).

At step 804, the client computing device 102 generates a query vector based at least in part on the query (e.g., as described above in conjunction with FIGS. 1-7). At step 806, the client computing device 102 generates an output vector based at least in part on the query vector and the user account vector (e.g., as described above in conjunction with FIGS. 1-7).

At step 808, the client computing device 102 obtains, based at least in part on the query, a plurality of digital asset vectors, wherein each digital asset vector of the plurality of digital asset vectors corresponds to a respective digital asset (e.g., as described above in conjunction with FIGS. 1-7).

At step 810, the client computing device 102 compares the output vector to the plurality of digital asset vectors to generate respective similarity scores for the plurality of digital asset vectors (e.g., as described above in conjunction with FIGS. 1-7). At step 812, the client computing device 102 filters the plurality of digital asset vectors in accordance with the similarity scores to establish a filtered plurality of digital asset vectors (e.g., as described above in conjunction with FIGS. 1-7).

At step 814, the client computing device 102 determines whether the query includes at least one question. If, at step 814, the client computing device 102 determines that the query includes at least one question, then the method 800 proceeds to steps 816 and 818 of FIG. 8B. As shown in FIG. 8B, at step 816, the client computing device 102 provides, to at least one machine learning model, (1) the query, and (2) the respective digital assets that correspond to the filtered plurality of digital asset vectors, to cause the at least one machine learning model to generate a descriptive answer to the at least one question. At step 818, the client computing device 102 displays an affordance for the descriptive answer. In turn, the method 800 proceeds to step 822 of FIG. 8A.

As shown in FIG. 8A, at step 822, the client computing device 102 displays, in accordance with the filtered plurality of digital asset vectors, respective affordances for the respective digital assets that correspond to the filtered plurality of digital asset vectors (e.g., as described above in conjunction with FIGS. 1-7).

It should be appreciated that the various functionalities described herein that are implemented by the client computing device 102 can be configured as one or more Application Programming Interfaces (APIs) (e.g., on one or more partner computing devices 130) to effectively enable other entities (e.g., software developers, cloud service providers, etc.) to access, implement, etc., the various functionalities. For example, the APIs can enable a given software application 104 to provide the different search functionalities described herein on data that is managed by the software application 104, data that is managed by other entities with which the software application 104 communicates, and so on. In another example, the various functionalities can be implemented as a cloud service to enable other entities to access, implement, etc. the various functionalities. For example, the cloud service can enable a given entity to upload its data for processing so that search queries can be issued against the data and search results can be obtained in accordance with the techniques described herein. It is noted that the foregoing examples are not meant to be limiting, and that the functionalities described herein can be provided, exposed to, etc., any number, type, form, etc., of entity, at any level of granularity, consistent with the scope of this disclosure.

Figure 9A:
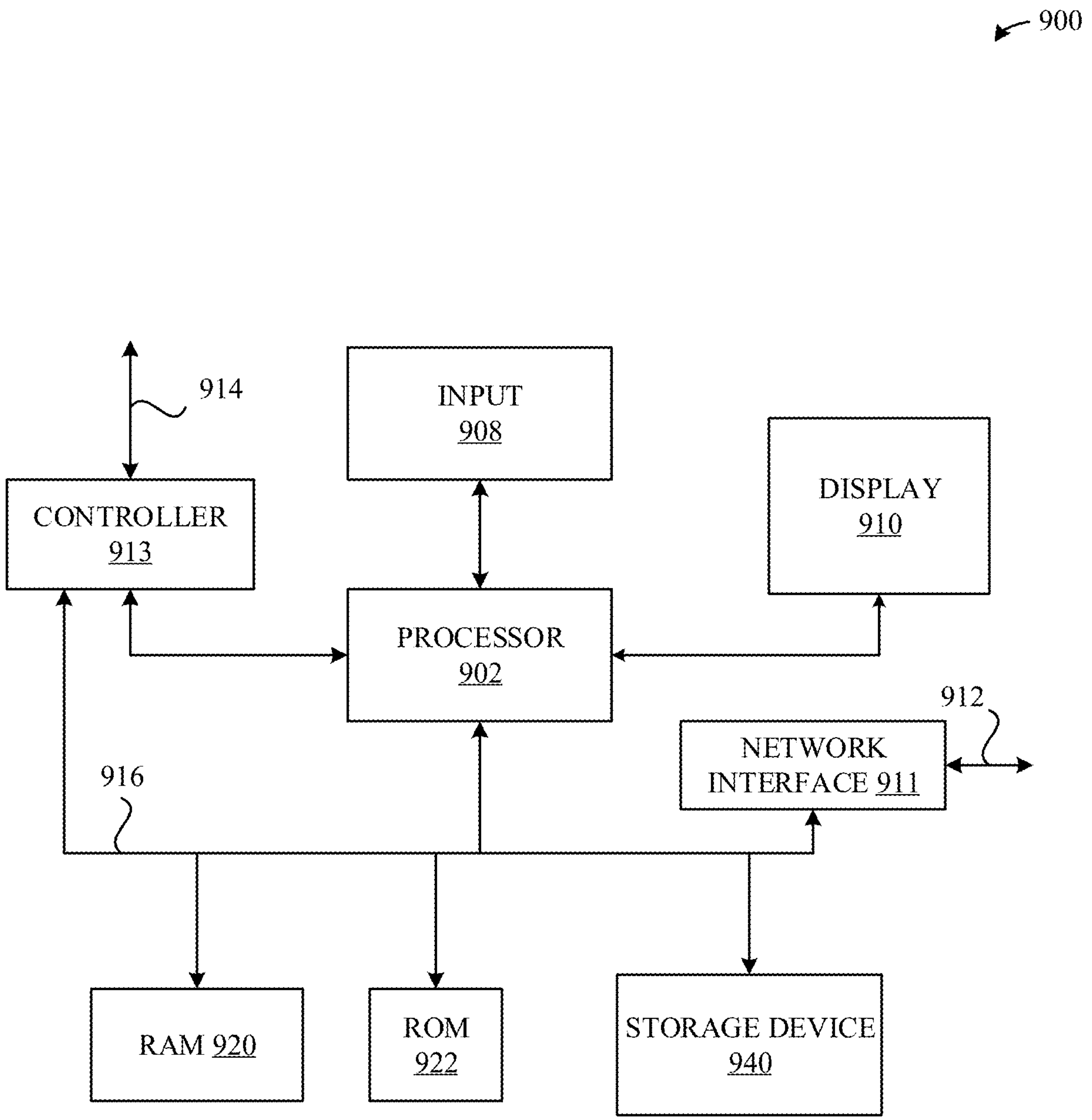
FIG. 9A illustrates a detailed view of a computing device that can be used to implement the various components described herein, according to some embodiments.

FIG. 9A illustrates a detailed view of a computing device 900 that can be used to implement the various components described herein, according to some embodiments. In particular, the detailed view illustrates various components that can be included in the client computing device 102, the partner computing device 130, and so on, described above in conjunction with FIG. 1.

As shown in FIG. 9A, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Furthermore, the computing device 900 can include a display 910 (screen display) that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include a wireless transceiver.

The computing device 900 also includes a storage device 940, which can comprise a single disk or a plurality of disks (e.g., SSDs), and includes a storage management module that manages one or more partitions within the storage device 940. In some embodiments, storage device 940 can include flash memory, semiconductor (solid state) memory or the like. The computing device 900 can also include a Random-Access Memory (RAM) 920 and a Read-Only Memory (ROM) 922. The ROM 922 can store programs, utilities, or processes to be executed in a non-volatile manner. The RAM 920 can provide volatile data storage, and stores instructions related to the operation of the computing devices described herein.

Implementations within the scope of the present disclosure can be partially or entirely realized using a tangible computer-readable storage medium (or multiple tangible computer-readable storage media of one or more types) encoding one or more computer-readable instructions. It should be recognized that computer-executable instructions can be organized in any format, including applications, widgets, processes, software, software modules, and/or components.

Figure 9B:
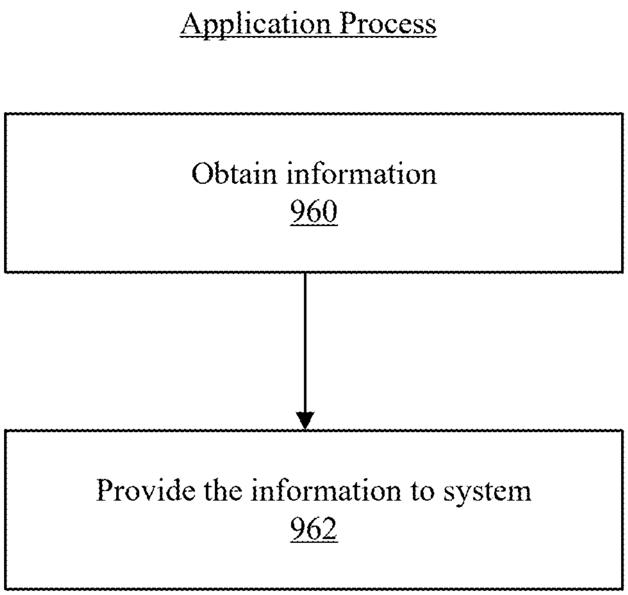
FIGS. 9B-9G illustrate the use of Application Programming Interfaces (APIs) to perform operations in accordance with some embodiments.
Figure 9C:
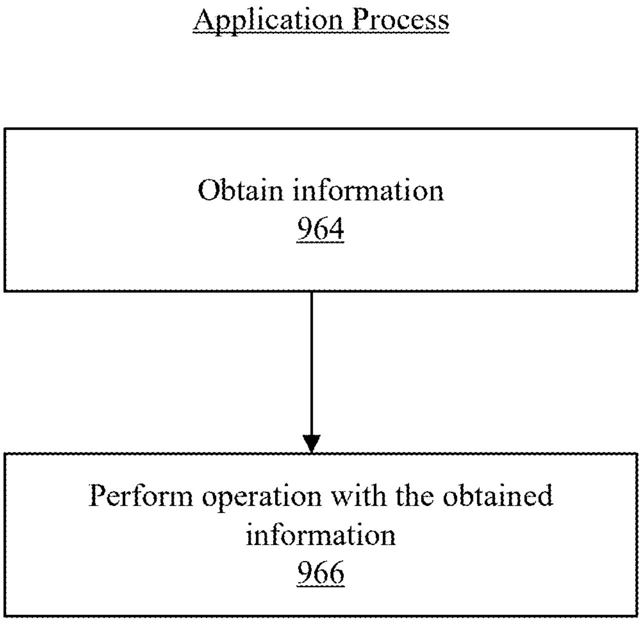

Implementations within the scope of the present disclosure include a computer-readable storage medium that encodes instructions organized as an application (e.g., application 970) that, when executed by one or more processing units, control an electronic device (e.g., device 968) to perform the process of FIG. 9B, the process of FIG. 9C, and/or one or more other processes and/or processes described herein.

It should be recognized that application 970 (e.g., illustrated in FIG. 9D) can be any suitable type of application, including, for example, one or more of: a browser application, an application that functions as an execution environment for plug-ins, widgets, or other applications, a fitness application, a health application, an accessory management application, a home application, a digital payments application, a media application, a social network application, a messaging application, and/or a maps application. In some embodiments, application 970 is an application that is pre-installed on device 968 at purchase (e.g., a first party application). In some embodiments, application 970 is an application that is provided to device 968 via an operating system update file (e.g., a first party application or a second party application). In other embodiments, application 970 is an application that is provided via an application store. In some embodiments, the application store can be an application store that is pre-installed on device 968 at purchase (e.g., a first party application store). In some embodiments, the application store is a third-party application store (e.g., an application store that is provided by another application store, downloaded via a network, and/or read from a storage device).

Figure 9D:
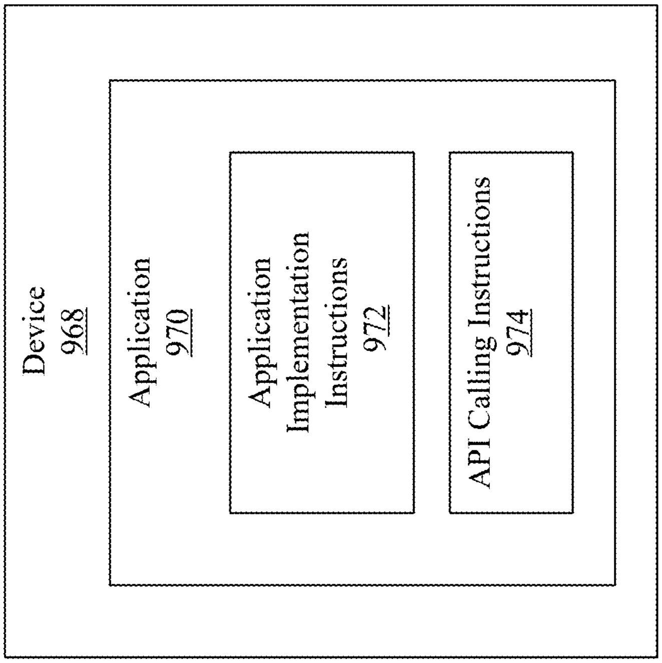
Figure 9E:
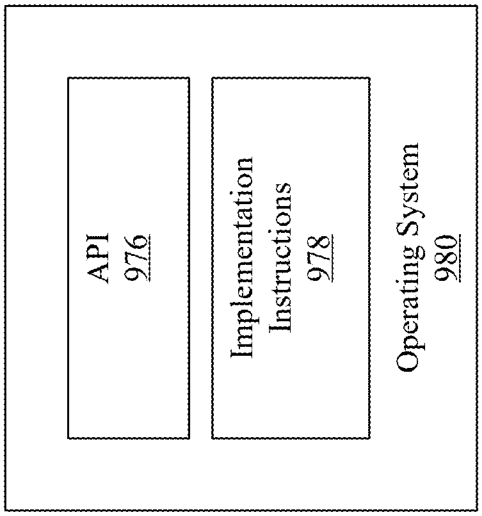
Figure 9F:
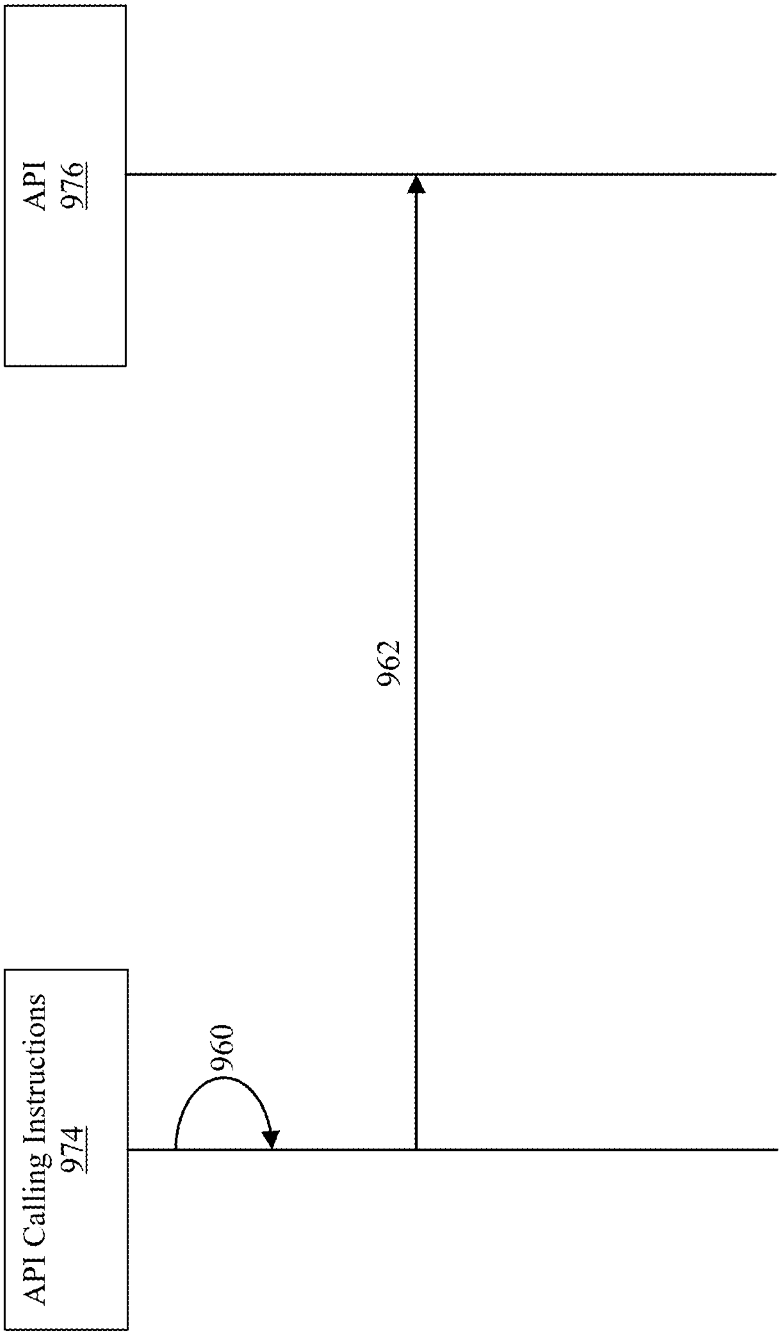
Figure 9G:
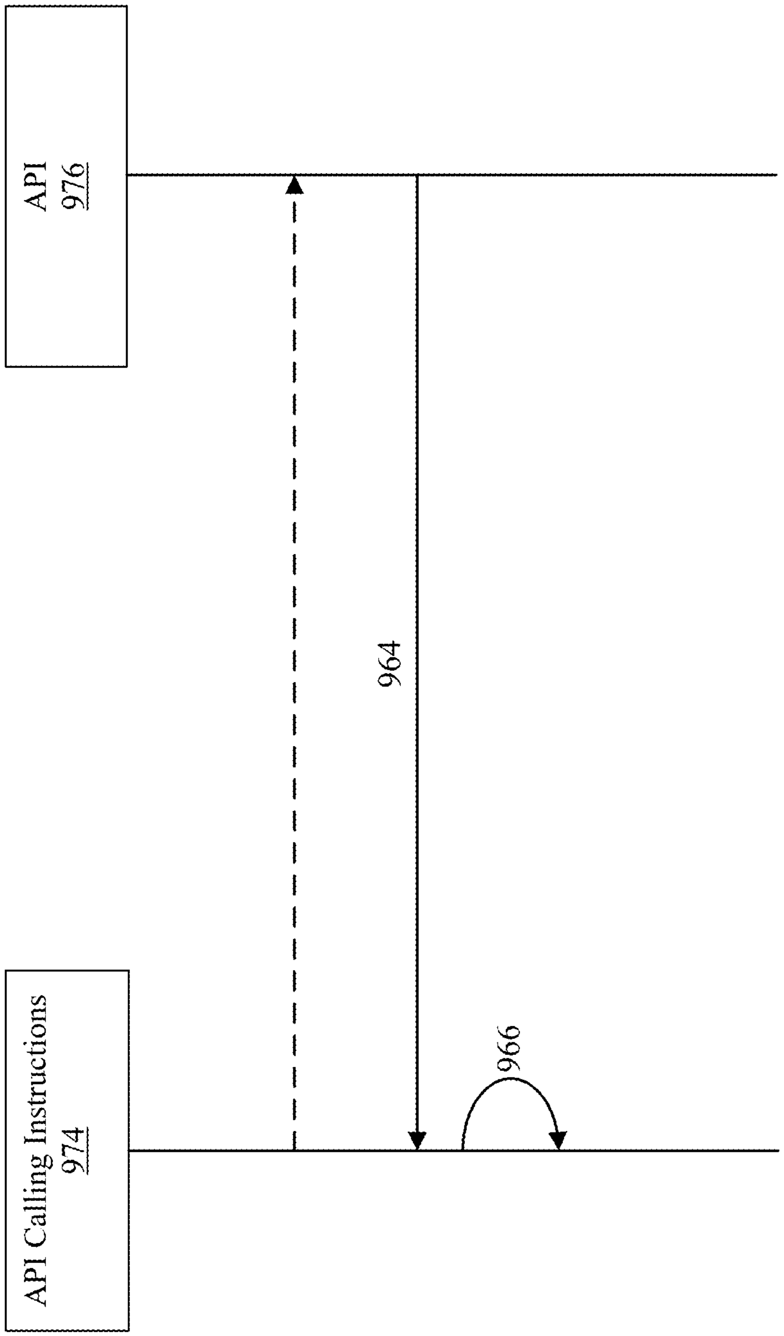

Referring to FIG. 9B and FIG. 9F, application 970 obtains information (e.g., 960). In some embodiments, at 960, information is obtained from at least one hardware component of device 968. In some embodiments, at 960, information is obtained from at least one software module (e.g., a set of one more instructions) of device 968. In some embodiments, at 960, information is obtained from at least one hardware component external to device 968 (e.g., a peripheral device, an accessory device, and/or a server). In some embodiments, the information obtained at 960 includes positional information, time information, notification information, user information, environment information, electronic device state information, weather information, media information, historical information, event information, hardware information, and/or motion information. In some embodiments, in response to and/or after obtaining the information at 960, application 970 provides the information to system (e.g., 962).

In some embodiments, the system (e.g., 980 as illustrated in FIG. 9E) is an operating system hosted on device 968. In some embodiments, the system (e.g., 980 as illustrated in FIG. 9E) is an external device (e.g., a server, a peripheral device, an accessory, and/or a personal computing device) that includes an operating system.

Referring to FIG. 9C, application 970 obtains information (e.g., 964). In some embodiments, the information obtained at 964 includes positional information, time information, notification information, user information, environment information, electronic device state information, weather information, media information, historical information, event information, hardware information, and/or motion information. In response to and/or after obtaining the information at 964, application 970 performs an operation with the information (e.g., 966). In some embodiments, the operation performed at 966 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 980 based on the information.

In some embodiments, one or more steps of the process of FIG. 9B and/or the process of FIG. 9C is performed in response to a trigger. In some embodiments, the trigger includes detection of an event, a notification received from system 980, a user input, and/or a response to a call to an API provided by system 980.

In some embodiments, the instructions of application 970, when executed, control device 968 to perform the process of FIG. 9B and/or the process of FIG. 9C by calling an application programming interface (API) (e.g., API 976) provided by system 980. In some embodiments, application 970 performs at least a portion of the process of FIG. 9B and/or the process of FIG. 9C without calling API 976.

In some embodiments, one or more steps of the process of FIG. 9B and/or the process of FIG. 9C includes calling an API (e.g., API 976) using one or more parameters defined by the API. In some embodiments, the one or more parameters include a constant, a key, a data structure, an object, an object class, a variable, a data type, a pointer, an array, a list or a pointer to a function or a process, and/or another way to reference a data or other item to be passed via the API.

Referring to FIG. 9D, device 968 is illustrated. In some embodiments, device 968 is a personal computing device, a smart phone, a smart watch, a fitness tracker, a head mounted display (HMD) device, a media device, a communal device, a speaker, a television, and/or a tablet. Device 968 includes application 970 and an operating system (not shown) (e.g., system 980 as illustrated in FIG. 9E). Application 970 includes application implementation instructions 972 and API calling instructions 974. System 980 includes API 976 and implementation instructions 978. It should be recognized that device 968, application 970, and/or system 980 can include more, fewer, and/or different components than illustrated in FIGS. 9D and 9E.

In some embodiments, application implementation instructions 972 is a software module that includes a set of one or more computer-readable instructions. In some embodiments, the set of one or more computer-readable instructions correspond to one or more operations performed by application 970. For example, when application 970 is a messaging application, application implementation instructions 972 can include operations to receive and send messages. In some embodiments, application implementation instructions 972 communicates with API calling instructions to communicate with system 980 via API 976 (e.g., as illustrated in FIG. 9E).

In some embodiments, API calling instructions 974 is a software module that includes a set of one or more computer-executable instructions.

In some embodiments, implementation instructions 978 is a software module that includes a set of one or more computer-executable instructions.

In some embodiments, API 976 is a software module that includes a set of one or more computer-executable instructions. In some embodiments, API 976 provides an interface that allows a different set of instructions (e.g., API calling instructions 974) to access and/or use one or more functions, processes, procedures, data structures, classes, and/or other services provided by implementation instructions 978 of system 980. For example, API calling instructions 974 can access a feature of implementation instructions 978 through one or more API calls or invocations (e.g., embodied by a function call, a method call, or a process call) exposed by API 976 and can pass data and/or control information using one or more parameters via the API calls or invocations. In some embodiments, API 976 allows application 970 to use a service provided by a Software Development Kit (SDK) library. In some embodiments, application 970 incorporates a call to a function or process provided by the SDK library and provided by API 976 or uses data types or objects defined in the SDK library and provided by API 976. In some embodiments, API calling instructions 974 makes an API call via API 976 to access and use a feature of implementation instructions 978 that is specified by API 976. In such embodiments, implementation instructions 978 can return a value via API 976 to API calling instructions 974 in response to the API call. The value can report to application 970 the capabilities or state of a hardware component of device 968, including those related to aspects such as input capabilities and state, output capabilities and state, processing capability, power state, storage capacity and state, and/or communications capability. In some embodiments, API 976 is implemented in part by firmware, microcode, or other low level logic that executes in part on the hardware component.

In some embodiments, API 976 allows a developer of API calling instructions 974 (which can be a third-party developer) to leverage a feature provided by implementation instructions 978. In such embodiments, there can be one or more sets of API calling instructions (e.g., including API calling instructions 974) that communicate with implementation instructions 978. In some embodiments, API 976 allows multiple sets of API calling instructions written in different programming languages to communicate with implementation instructions 978 (e.g., API 976 can include features for translating calls and returns between implementation instructions 978 and API calling instructions 974) while API 976 is implemented in terms of a specific programming language. In some embodiments, API calling instructions 974 calls APIs from different providers such as a set of APIs from an OS provider, another set of APIs from a plug-in provider, and/or another set of APIs from another provider (e.g., the provider of a software library) or creator of the another set of APIs.

Examples of API 976 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments the sensor API is an API for accessing data associated with a sensor of device 968. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor and/or biometric sensor.

In some embodiments, implementation instructions 978 is a system (e.g., an operating system and/or a server system) software module (e.g., a collection of computer-readable instructions) that is constructed to perform an operation in response to receiving an API call via API 976. In some embodiments, implementation instructions 978 is constructed to provide an API response (via API 976) as a result of processing an API call. By way of example, implementation instructions 978 and API calling instructions 974 can each be any one of an operating system, a library, a device driver, an API, an application program, or other module. It should be understood that implementation instructions 978 and API calling instructions 974 can be the same or different type of software module from each other. In some embodiments, implementation instructions 978 is embodied at least in part in firmware, microcode, or other hardware logic.

In some embodiments, implementation instructions 978 returns a value through API 976 in response to an API call from API calling instructions 974. While API 976 defines the syntax and result of an API call (e.g., how to invoke the API call and what the API call does), API 976 might not reveal how implementation instructions 978 accomplishes the function specified by the API call. Various API calls are transferred via the one or more application programming interfaces between API calling instructions 974 and implementation instructions 978. Transferring the API calls can include issuing, initiating, invoking, calling, receiving, returning, and/or responding to the function calls or messages. In other words, transferring can describe actions by either of API calling instructions 974 or implementation instructions 978. In some embodiments, a function call or other invocation of API 976 sends and/or receives one or more parameters through a parameter list or other structure.

In some embodiments, implementation instructions 978 provides more than one API, each providing a different view of or with different aspects of functionality implemented by implementation instructions 978. For example, one API of implementation instructions 978 can provide a first set of functions and can be exposed to third party developers, and another API of implementation instructions 978 can be hidden (e.g., not exposed) and provide a subset of the first set of functions and also provide another set of functions, such as testing or debugging functions which are not in the first set of functions. In some embodiments, implementation instructions 978 calls one or more other components via an underlying API and thus be both an API calling instructions and an implementation instructions. It should be recognized that implementation instructions 978 can include additional functions, processes, classes, data structures, and/or other features that are not specified through API 976 and are not available to API calling instructions 974. It should also be recognized that API calling instructions 974 can be on the same system as implementation instructions 978 or can be located remotely and access implementation instructions 978 using API 976 over a network. In some embodiments, implementation instructions 978, API 976, and/or API calling instructions 974 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

In some embodiments, process 800 (e.g., FIG. 8) is performed at a first computer system (as described herein) via a system process (e.g., an operating system process and/or a server system process) that is different from one or more applications executing and/or installed on the first computer system.

In some embodiments, process 800 (e.g., FIG. 8) is performed at a first computer system (as described herein) by an application that is different from a system process.

In some embodiments, the instructions of the application, when executed, control the first computer system to perform process 800 (e.g., FIG. 8) by calling an application programming interface (API) provided by the system process.

In some embodiments, the application performs at least a portion of one or process 800 (e.g., FIG. 8) without calling the API.

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, the application is an application that is pre-installed on the first computer system at purchase (e.g., a first party application). In some embodiments, the application is an application that is provided to the first computer system via an operating system update file (e.g., a first party application). In some embodiments, the application is an application that is provided via an application store. In some embodiments, the application store is pre-installed on the first computer system at purchase (e.g., a first party application store) and allows download of one or more applications. In some embodiments, the application store is a third party application store (e.g., an application store that is provided by another device, downloaded via a network, and/or read from a storage device). In some embodiments, the application is a third party application (e.g., an app that is provided by an application store, downloaded via a network, and/or read from a storage device). In some embodiments, the application controls the first computer system to perform one or more process 800 (e.g., FIG. 8) by calling an application programming interface (API) provided by the system process using one or more parameters.

In some embodiments, at least one API is a software module (e.g., a collection of computer-readable instructions) that provides an interface that allows a different set of instructions (e.g., API calling instructions) to access and use one or more functions, processes, procedures, data structures, classes, and/or other services provided by a set of implementation instructions of the system process. The API can define one or more parameters that are passed between the API calling instructions and the implementation instructions.

As described above, in some embodiments, an application controls a computer system to perform process 800 (e.g., FIG. 8) by calling an application programming interface (API) provided by a system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, API 976 defines a first API call that can be provided by API calling instructions 974, wherein the definition for the first API call specifies call parameters described above with respect to process 800 (e.g., FIG. 8).

In some embodiments, API 976 defines a first API call response that can be provided to an application by API calling instructions 974, wherein the first API call response includes parameters described above with respect to process 800 (e.g., FIG. 8).

In some embodiments, the set of implementation instructions is a system software module (e.g., a collection of computer-readable instructions) that is constructed to perform an operation in response to receiving an API call via the API. In some embodiments, the set of implementation instructions is constructed to provide an API response (via the API) as a result of processing an API call.

In some embodiments, the set of implementation instructions is included in the device (e.g., 168) that runs the application. In some embodiments, the set of implementation instructions is included in an electronic device that is separate from the device that runs the application.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

In some embodiments, content is automatically generated by one or more computer systems in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly, a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example, when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other embodiments, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some embodiments, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method for providing relevant search results for search queries, the method comprising, by a client computing device:

receiving a query, wherein the query is associated with a user account, and the user account is associated with a user account vector;

generating a query vector based at least in part on the query;

generating an output vector based at least in part on the query vector and the user account vector;

obtaining, based at least in part on the query, a plurality of digital asset vectors, wherein each digital asset vector of the plurality of digital asset vectors corresponds to a respective digital asset;

comparing the output vector to the plurality of digital asset vectors to generate respective similarity scores for the plurality of digital asset vectors;

filtering the plurality of digital asset vectors in accordance with the similarity scores to establish a filtered plurality of digital asset vectors; and displaying, in accordance with the filtered plurality of digital asset vectors, respective affordances for the respective digital assets that correspond to the filtered plurality of digital asset vectors.

2. The method of claim 1, wherein the query comprises text content, image content, audio content, video content, or some combination thereof.

3. The method of claim 1, wherein the query vector is generated based at least in part on the query using a transformer-based large language model (LLM).

4. The method of claim 1, wherein the user account vector is generated based at least in part on:

a first set digital asset vectors that correspond to digital assets marked as favorites in association with the user account;

a second set of digital asset vectors that correspond to digital assets that are frequently accessed in association with the user account; and a third set of query history vectors that correspond to queries provided in association with the user account within a threshold period of time.

5. The method of claim 1, further comprising, prior to generating the output vector based at least in part on the query vector and the user account vector:

concatenating the query vector to the user account vector, or vice-versa.

6. The method of claim 1, wherein:

the output vector is generated based at least in part on the query vector and the user account vector using a transformer-based large language model (LLM), and the transformer-based LLM implements a set of fully connected layers and a set of input normalization layers.

7. The method of claim 1, wherein a given digital asset vector of the plurality of digital asset vectors is generated by:

obtaining, from a transformer-based LLM, a first digital asset vector based at least in part on metadata associated with the corresponding respective digital asset;

obtaining, from a machine learning model, a second digital asset vector based at least in part on data content of the corresponding respective digital asset; and generating the digital asset vector based at least in part on combining the first and second digital asset vectors.

8. The method of claim 1, wherein filtering the plurality of digital asset vectors in accordance with the similarity scores to establish the filtered plurality of digital asset vectors comprises:

excluding, from the filtered plurality of digital asset vectors, digital asset vectors having respective similarity scores that do not satisfy a threshold similarity score.

9. The method of claim 1, further comprising:

determining that the query includes at least one question;

providing, to at least one machine learning model, (1) the query, and (2) the respective digital assets that correspond to the filtered plurality of digital asset vectors, to cause the at least one machine learning model to generate a descriptive answer to the at least one question; and displaying an affordance for the descriptive answer.

10. The method of claim 1, wherein obtaining, based at least in part on the query, the plurality of digital asset vectors comprises:

generating at least one retrieval tree based at least in part on at least one keyword associated with the query;

comparing the at least one retrieval tree against at least one keyword index to identify a first plurality of digital asset vectors using keyword-based searching;

generating at least one embedding based at least in part on the query;

comparing the at least one embedding against at least one vector index to identify a second plurality of digital asset vectors using semantic-based searching; and generating the plurality of digital asset vectors based at least in part on the first and second plurality of digital asset vectors.

11. The method of claim 10, wherein:

each digital asset vector in the first and second plurality of digital asset vectors is associated with a respective relevance score; and generating the plurality of digital asset vectors based on the first and second plurality of digital asset vectors comprises:

calibrating the respective relevance score of each digital asset vector in the second plurality of digital asset vectors to coincide with the respective relevance scores of the digital asset vectors in the first plurality of digital asset vectors, and combining, by way of adjusting, filtering, or some combination thereof, the first and second plurality of digital asset vectors, into the plurality of digital asset vectors.

12. A non-transitory computer readable storage medium configured to store instructions that, when executed by at least one processor included in a client computing device, cause the client computing device to provide relevant search results for search queries, by carrying out steps that include:

receiving a query, wherein the query is associated with a user account, and the user account is associated with a user account vector;

generating a query vector based at least in part on the query;

generating an output vector based at least in part on the query vector and the user account vector;

obtaining, based at least in part on the query, a plurality of digital asset vectors, wherein each digital asset vector of the plurality of digital asset vectors corresponds to a respective digital asset;

comparing the output vector to the plurality of digital asset vectors to generate respective similarity scores for the plurality of digital asset vectors;

filtering the plurality of digital asset vectors in accordance with the similarity scores to establish a filtered plurality of digital asset vectors; and displaying, in accordance with the filtered plurality of digital asset vectors, respective affordances for the respective digital assets that correspond to the filtered plurality of digital asset vectors.

13. The non-transitory computer readable storage medium of claim 12, wherein the query comprises text content, image content, audio content, video content, or some combination thereof.

14. The non-transitory computer readable storage medium of claim 12, wherein the query vector is generated based at least in part on the query using a transformer-based large language model (LLM).

15. The non-transitory computer readable storage medium of claim 12, wherein the user account vector is generated based at least in part on:

a first set digital asset vectors that correspond to digital assets marked as favorites in association with the user account;

a second set of digital asset vectors that correspond to digital assets that are frequently accessed in association with the user account; and a third set of query history vectors that correspond to queries provided in association with the user account within a threshold period of time.

16. The non-transitory computer readable storage medium of claim 12, wherein the steps further include, prior to generating the output vector based at least in part on the query vector and the user account vector:

concatenating the query vector to the user account vector, or vice-versa.

17. The non-transitory computer readable storage medium of claim 12, wherein:

the output vector is generated based at least in part on the query vector and the user account vector using a transformer-based large language model (LLM), and the transformer-based LLM implements a set of fully connected layers and a set of input normalization layers.

18. The non-transitory computer readable storage medium of claim 12, wherein a given digital asset vector of the plurality of digital asset vectors is generated by:

obtaining, from a transformer-based LLM, a first digital asset vector based at least in part on metadata associated with the corresponding respective digital asset;

obtaining, from a machine learning model, a second digital asset vector based at least in part on data content of the corresponding respective digital asset; and generating the digital asset vector based at least in part on combining the first and second digital asset vectors.

19. The non-transitory computer readable storage medium of claim 12, wherein filtering the plurality of digital asset vectors in accordance with the similarity scores to establish the filtered plurality of digital asset vectors comprises:

excluding, from the filtered plurality of digital asset vectors, digital asset vectors having respective similarity scores that do not satisfy a threshold similarity score.

20. The non-transitory computer readable storage medium of claim 12, wherein the steps further include:

determining that the query includes at least one question;

providing, to at least one machine learning model, (1) the query, and (2) the respective digital assets that correspond to the filtered plurality of digital asset vectors, to cause the at least one machine learning model to generate a descriptive answer to the at least one question; and displaying an affordance for the descriptive answer.

21. The non-transitory computer readable storage medium of claim 12, wherein obtaining, based at least in part on the query, the plurality of digital asset vectors comprises:

generating at least one retrieval tree based at least in part on at least one keyword associated with the query;

comparing the at least one retrieval tree against at least one keyword index to identify a first plurality of digital asset vectors using keyword-based searching;

generating at least one embedding based at least in part on the query;

comparing the at least one embedding against at least one vector index to identify a second plurality of digital asset vectors using semantic-based searching; and generating the plurality of digital asset vectors based at least in part on the first and second plurality of digital asset vectors.

22. The non-transitory computer readable storage medium of claim 21, wherein:

each digital asset vector in the first and second plurality of digital asset vectors is associated with a respective relevance score; and generating the plurality of digital asset vectors based on the first and second plurality of digital asset vectors comprises:

calibrating the respective relevance score of each digital asset vector in the second plurality of digital asset vectors to coincide with the respective relevance scores of the digital asset vectors in the first plurality of digital asset vectors, and combining, by way of adjusting, filtering, or some combination thereof, the first and second plurality of digital asset vectors, into the plurality of digital asset vectors.

23. A client computing device configured to provide relevant search results for search queries, the computing device comprising:

at least one processor; and at least one memory storing instructions that, when executed by the at least one processor, cause the client computing device to carry out steps that include:

receiving a query, wherein the query is associated with a user account, and the user account is associated with a user account vector;

generating a query vector based at least in part on the query;

generating an output vector based at least in part on the query vector and the user account vector;

obtaining, based at least in part on the query, a plurality of digital asset vectors, wherein each digital asset vector of the plurality of digital asset vectors corresponds to a respective digital asset;

comparing the output vector to the plurality of digital asset vectors to generate respective similarity scores for the plurality of digital asset vectors;

filtering the plurality of digital asset vectors in accordance with the similarity scores to establish a filtered plurality of digital asset vectors; and displaying, in accordance with the filtered plurality of digital asset vectors, respective affordances for the respective digital assets that correspond to the filtered plurality of digital asset vectors.

24. The client computing device of claim 23, wherein the query comprises text content, image content, audio content, video content, or some combination thereof.

25. The client computing device of claim 23, wherein the query vector is generated based at least in part on the query using a transformer-based large language model (LLM).

26. The client computing device of claim 23, wherein the user account vector is generated based at least in part on:

a first set digital asset vectors that correspond to digital assets marked as favorites in association with the user account;

a second set of digital asset vectors that correspond to digital assets that are frequently accessed in association with the user account; and a third set of query history vectors that correspond to queries provided in association with the user account within a threshold period of time.

27. The client computing device of claim 23, wherein the steps further include, prior to generating the output vector based at least in part on the query vector and the user account vector:

concatenating the query vector to the user account vector, or vice-versa.

28. The client computing device of claim 23, wherein:

the output vector is generated based at least in part on the query vector and the user account vector using a transformer-based large language model (LLM), and the transformer-based LLM implements a set of fully connected layers and a set of input normalization layers.

29. The client computing device of claim 23, wherein a given digital asset vector of the plurality of digital asset vectors is generated by:

obtaining, from a transformer-based LLM, a first digital asset vector based at least in part on metadata associated with the corresponding respective digital asset;

obtaining, from a machine learning model, a second digital asset vector based at least in part on data content of the corresponding respective digital asset; and generating the digital asset vector based at least in part on combining the first and second digital asset vectors.

30. The client computing device of claim 23, wherein filtering the plurality of digital asset vectors in accordance with the similarity scores to establish the filtered plurality of digital asset vectors comprises:

excluding, from the filtered plurality of digital asset vectors, digital asset vectors having respective similarity scores that do not satisfy a threshold similarity score.

31. The client computing device of claim 23, wherein the steps further include:

determining that the query includes at least one question;

providing, to at least one machine learning model, (1) the query, and (2) the respective digital assets that correspond to the filtered plurality of digital asset vectors, to cause the at least one machine learning model to generate a descriptive answer to the at least one question; and displaying an affordance for the descriptive answer.

32. The client computing device of claim 23, wherein obtaining, based at least in part on the query, the plurality of digital asset vectors comprises:

generating at least one retrieval tree based at least in part on at least one keyword associated with the query;

comparing the at least one retrieval tree against at least one keyword index to identify a first plurality of digital asset vectors using keyword-based searching;

generating at least one embedding based at least in part on the query;

comparing the at least one embedding against at least one vector index to identify a second plurality of digital asset vectors using semantic-based searching; and generating the plurality of digital asset vectors based at least in part on the first and second plurality of digital asset vectors.

33. The client computing device of claim 32, wherein:

each digital asset vector in the first and second plurality of digital asset vectors is associated with a respective relevance score; and generating the plurality of digital asset vectors based on the first and second plurality of digital asset vectors comprises:

calibrating the respective relevance score of each digital asset vector in the second plurality of digital asset vectors to coincide with the respective relevance scores of the digital asset vectors in the first plurality of digital asset vectors, and combining, by way of adjusting, filtering, or some combination thereof, the first and second plurality of digital asset vectors, into the plurality of digital asset vectors.

34. The method of claim 1, wherein the plurality of digital asset vectors are obtained using keyword-based searching and semantic-based searching.

35. The method of claim 1, wherein the query is a first query, the method further comprising:

after receiving the first query and before obtaining the plurality of digital asset vectors, generating a second query, based at least in part on the first query and one or more knowledge sources, wherein the plurality of digital asset vectors are obtained based at least in part on the second query.

* * * * *